US012750751B2

(12) United States Patent
Fahim et al.

(10) Patent No.: US 12,750,751 B2
(45) Date of Patent: Sep. 29, 2026

(54) DIGITAL TWIN ASSISTED HANDOVER THROUGH REFERENCE SIGNAL RECEIVED POWER PREDICTION

(71) Applicant: QUALCOMM Incorporated, San Diego, CA (US)

(72) Inventors: Mohammad Tarek Fahim, San Diego, CA (US); Roohollah Amiri, San Diego, CA (US); Srinivas Yerramalli, San Diego, CA (US); Arumugam Chendamarai Kannan, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/424,097

(22) Filed: Jan. 26, 2024

(65) Prior Publication Data

US 2025/0247759 A1 Jul. 31, 2025

(51) Int. Cl.
*H04W 36/30* (2009.01)
*H04W 36/00* (2009.01)

(52) U.S. Cl.
CPC ....... *H04W 36/30* (2013.01); *H04W 36/0058* (2018.08)

(58) Field of Classification Search
CPC ............. H04W 36/30; H04W 36/0058; H04W 36/00837; H04W 36/00838; H04W 36/0085; H04W 36/0088; H04W 36/0094; H04W 36/24; H04W 36/302;
(Continued)

(56) References Cited

U.S. PATENT DOCUMENTS

2021/0136762 A1* 5/2021 Park .................. H04W 72/0453
2022/0014946 A1 1/2022 Merwaday et al.
(Continued)

OTHER PUBLICATIONS

International Search Report and Written Opinion—PCT/US2025/012136—ISA/EPO—Apr. 15, 2025.
(Continued)

*Primary Examiner* — Sun Jong Kim
(74) *Attorney, Agent, or Firm* — QUALCOMM Incorporated

(57) ABSTRACT

Methods, systems, and devices for wireless communication are described. The techniques described herein relate an assisted handover through reference signal received power (RSRP) prediction. A user equipment (UE) may receive configuration information indicative of a first handover condition for handover of the UE from a serving network entity to a target network entity. The UE transmits a measurement report before the expiration of the handover preparation condition monitoring period and it is based on application of a DT model. The UE may transmit, before expiration of the handover preparation condition monitoring period, the handover-associated measurement report based on the satisfaction of a first handover condition during the handover preparation condition monitoring period. The UE may participate in a handover operation based on transmission of the handover-associated measurement report.

30 Claims, 18 Drawing Sheets

(58) Field of Classification Search
CPC .. H04W 36/304; H04W 36/249; G06N 20/00; H04L 41/145; H04L 41/147
See application file for complete search history.

(56) References Cited

U.S. PATENT DOCUMENTS

| | | | | |
|---|---|---|---|---|
| 2022/0286927 | A1 | 9/2022 | Madadi et al. | |
| 2023/0362681 | A1* | 11/2023 | Nam | H04W 24/02 |

OTHER PUBLICATIONS

Moderator (Vivo): "FL Summary #1 of Other Aspects on AI/ML for Positioning Accuracy Enhancement", 3GPP TSG RAN WG1 Meeting #113, R1-2305992, 3rd Generation Partnership Project, Mobile Competence Centre, 650, Route Des Lucioles, F-06921, Sophia-Antipolis Cedex, France, vol. 3GPP RAN 1, No. Incheon, Korea; May 22, 2023-May 26, 2023, May 22, 2023, 86 Pages, XP052483663, the Whole Document.

* cited by examiner

DIGITAL TWIN ASSISTED HANDOVER THROUGH REFERENCE SIGNAL RECEIVED POWER PREDICTION

FIELD OF TECHNOLOGY

The following relates to wireless communication, including digital twin assisted handover through reference signal received power prediction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, a network entity may instruct a UE to participate in a handover operation where the UE switches from communicating with a serving cell to a target cell. For example, the UE may measure a reference signal received power (RSRP) (e.g., signal strength) of each beam of the serving cell and the target cell, and the UE may monitor the beams for meeting a handover preparation condition during a handover preparation condition monitoring period to participate in the handover operation. In some examples, the handover preparation condition may be met when the RSRP of the serving cell is less than the RSRP of the target cell during the handover preparation condition monitoring period. The UE may report the measurements to the serving cell after the handover preparation condition monitoring period, the serving cell may initiate the handover operation to handover communications to the target cell, and the UE may be reconfigured by the serving cell to communicate with the target cell.

SUMMARY

The described techniques relate to improved methods, systems, devices, and apparatuses that support digital twin (DT) assisted handover through reference signal received power (RSRP) prediction. A DT model may be located at the user equipment (UE), a serving cell, or at a DT management function (DTMF) associated with the network, that predicts RSRP values for beams used for communicating with the serving cell and one or more target cells. Using the DT model to predict RSRP values may facilitate the UE in transmitting a measurement report before expiration of a handover preparation condition monitoring period. For example, the UE may monitor for a first instance of satisfying a handover preparation condition to send the measurement report, such that the measurement report is sent before expiration of a handover preparation condition monitoring period. In examples where the DT model is located at the DTMF, the UE may send the measurement report directly to the DTMF or to the serving cell to forward to the DTMF, and the DTMF may predict the RSRPs of the beams. In examples where the DT model is located at the serving cell, the UE may send the measurement report to the serving cell and the serving cell may predict the RSRPs. In examples where the DT model is located at the UE, the UE may predict the RSRP values after the first instance of fulfillment of the handover preparation condition. The UE may send the measurement report to the serving cell if the predicted RSRP values would satisfy the handover preparation condition for the rest of the handover preparation condition monitoring period, and the serving cell may facilitate the handover operation. The DT assisted handover may reduce delay and handover latency, for example, that may otherwise be associated with the UE monitoring the handover preparation condition for the entire handover preparation condition monitoring period.

A method for wireless communication by a UE is described. The method may include receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model, transmitting, before expiration of the handover preparation condition monitoring period, the handover-associated measurement report based on the satisfaction of the first handover condition during the handover preparation condition monitoring period, and participating in a handover operation for handover of the UE from the serving network entity to the target network entity based on transmission of the handover-associated measurement report.

A UE for wireless communication is described. The UE may include one or more memories storing processor executable code, and one or more processors coupled with the one or more memories. The one or more processors may individually or collectively be operable to execute the code to cause the UE to receive configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model, transmit, before expiration of the handover preparation condition monitoring period, the handover-associated measurement report based on the satisfaction of the first handover condition during the handover preparation condition monitoring period, and participate in a handover operation for handover of the UE from the serving network entity to the target network entity based on transmission of the handover-associated measurement report.

Another UE for wireless communication is described. The UE may include means for receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model, means for transmitting, before expiration of the handover preparation condition monitoring period, the handover-associated measurement report based on the satisfaction of the first handover condition during the handover preparation condition monitoring period, and means for participating in a handover operation for handover of the UE from the serving network entity to the target network entity based on transmission of the handover-associated measurement report.

A non-transitory computer-readable medium storing code for wireless communication is described. The code may include instructions executable by one or more processors to receive configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model, transmit, before expiration of the handover preparation condition monitoring period, the handover-associated measurement report based on the satisfaction of the first handover condition during the handover preparation condition monitoring period, and participate in a handover operation for handover of the UE from the serving network entity to the target network entity based on transmission of the handover-associated measurement report.

In some examples of the method, UEs, and non-transitory computer-readable medium described herein, transmitting the handover-associated measurement report may include operations, features, means, or instructions for transmitting the handover-associated measurement report to the serving network entity, where the DT model may be at one of the serving network entity or a DTMF.

In some examples of the method, UEs, and non-transitory computer-readable medium described herein, transmitting the handover-associated measurement report may include operations, features, means, or instructions for transmitting the handover-associated measurement report to a DTMF associated with the serving network entity and the target network entity.

Some examples of the method, UEs, and non-transitory computer-readable medium described herein may further include operations, features, means, or instructions for determining, using a DTMF at the UE, that the first handover condition may be expected to be satisfied during one or more future instances of the handover preparation condition monitoring period.

In some examples of the method, UEs, and non-transitory computer-readable medium described herein, the handover-associated measurement report may be transmitted based on an expectation that the first handover condition may be to be satisfied during the handover preparation condition monitoring period.

Some examples of the method, UEs, and non-transitory computer-readable medium described herein may further include operations, features, means, or instructions for receiving a reconfiguration message in response to transmission of the handover-associated measurement report, monitoring for satisfaction of a second handover condition during a handover execution condition monitoring period that may be after receipt of the reconfiguration message, and initiating random access with the target network entity as part of the handover operation, where initiation of the random access may be before expiration of the handover execution condition monitoring period and may be based on satisfaction of the second handover condition during the handover execution condition monitoring period.

Some examples of the method, UEs, and non-transitory computer-readable medium described herein may further include operations, features, means, or instructions for determining, based on satisfaction of the second handover condition during the handover execution condition monitoring period and using the DTMF at the UE, that the second handover condition may be expected to be satisfied during one or more future instances of the handover execution condition monitoring period.

In some examples of the method, UEs, and non-transitory computer-readable medium described herein, the random access with the target network entity may be initiated based on an expectation that the second handover condition may be to be satisfied during the handover execution condition monitoring period.

In some examples of the method, UEs, and non-transitory computer-readable medium described herein, the DT model may be representative of a physical environment associated with the UE, the serving network entity, and the target network entity.

In some examples of the method, UEs, and non-transitory computer-readable medium described herein, the DT model may be further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

In some examples of the method, UEs, and non-transitory computer-readable medium described herein, the physical environment may be represented in the DT model by predicted RSRP values at the UE with respect to other components of the physical environment, or by predicted values that define a channel, at the UE, with respect to the other components of the physical environment and the other components of the physical environment include the serving network entity and the target network entity.

In some examples of the method, UEs, and non-transitory computer-readable medium described herein, the physical environment may be represented in the DT model by predicted locations of the UE based on RSRP values or CIR values at the UE with respect to other components of the physical environment and the other components of the physical environment include the serving network entity and the target network entity.

In some examples of the method, UEs, and non-transitory computer-readable medium described herein, the physical environment may be represented in the DT model by predicted trajectories of the UE based on a history of RSRP values and associated timestamps at the UE with respect to other components of the physical environment and the other components of the physical environment include the serving network entity and the target network entity.

In some examples of the method, UEs, and non-transitory computer-readable medium described herein, the physical environment may be represented in the DT model by predicted future RSRP values at the UE based on predicted trajectories of the UE and predicted coverage distribution at the UE.

In some examples of the method, UEs, and non-transitory computer-readable medium described herein, the DT model may be associated with specific DT model capabilities and the DT model capabilities include one or more supported RSRP measurement filtering types, an RSRP measurements history size, a maximum time interval during which future RSRP values may be predicted, or combinations thereof.

In some examples of the method, UEs, and non-transitory computer-readable medium described herein, receiving the configuration information may include operations, features, means, or instructions for receiving a request to report a history of latest received RSRP values in support of the DT model, where the request specifies that the history may be for a single cell, for all neighbor cells, or for a limited quantity of cells having strongest RSRP values.

In some examples of the method, UEs, and non-transitory computer-readable medium described herein, the configuration information that may be indicative that the UE may be to transmit the handover-associated measurement report before expiration of the handover preparation condition monitoring period may be indicated as a preparation monitoring time fraction and the preparation monitoring time fraction may be expressed as a fraction of the handover preparation condition monitoring period or as a quantity of times the first handover condition may be to be satisfied during the handover preparation condition monitoring period.

In some examples of the method, UEs, and non-transitory computer-readable medium described herein, the configuration information may be further indicative that the UE may be to transmit the handover-associated measurement report before expiration of a handover execution condition monitoring period by an execution monitoring time fraction and the execution monitoring time fraction may be expressed as a fraction of the handover execution condition monitoring period or as a quantity of times a second handover condition may be to be satisfied during the handover execution condition monitoring period.

A method for wireless communication by a serving network entity is described. The method may include transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model and participating in a handover operation for handover of the UE from the serving network entity to the target network entity based on the handover-associated measurement report.

A serving network entity for wireless communication is described. The serving network entity may include one or more memories storing processor executable code, and one or more processors coupled with the one or more memories. The one or more processors may individually or collectively be operable to execute the code to cause the serving network entity to transmit configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model and participate in a handover operation for handover of the UE from the serving network entity to the target network entity based on the handover-associated measurement report.

Another serving network entity for wireless communication is described. The serving network entity may include means for transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model and means for participating in a handover operation for handover of the UE from the serving network entity to the target network entity based on the handover-associated measurement report.

A non-transitory computer-readable medium storing code for wireless communication is described. The code may include instructions executable by one or more processors to transmit configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model and participate in a handover operation for handover of the UE from the serving network entity to the target network entity based on the handover-associated measurement report.

Some examples of the method, serving network entities, and non-transitory computer-readable medium described herein may further include operations, features, means, or instructions for receiving the handover-associated measurement report from the UE, where the DT model may be at one of the serving network entity or a DTMF.

Some examples of the method, serving network entities, and non-transitory computer-readable medium described herein may further include operations, features, means, or instructions for forwarding the handover-associated measurement report to the DTMF when the DT model may be at the DTMF.

Some examples of the method, serving network entities, and non-transitory computer-readable medium described herein may further include operations, features, means, or instructions for determining, when the DT model may be at the serving network entity, that the first handover condition may be expected to be satisfied during one or more future instances of the handover preparation condition monitoring period.

Some examples of the method, serving network entities, and non-transitory computer-readable medium described herein may further include operations, features, means, or instructions for transmitting a handover request to the target network entity based on an expectation that the first handover condition may be to be satisfied during the handover preparation condition monitoring period.

In some examples of the method, serving network entities, and non-transitory computer-readable medium described herein, the DT model may be representative of a physical environment associated with the UE, the serving network entity, and the target network entity.

In some examples of the method, serving network entities, and non-transitory computer-readable medium described herein, the DT model may be further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

In some examples of the method, serving network entities, and non-transitory computer-readable medium described herein, the physical environment may be represented in the DT model by predicted RSRP values at the UE with respect to other components of the physical environment, or by predicted values that define a channel, at the UE, with respect to the other components of the physical environment and the other components of the physical environment include the serving network entity and the target network entity.

In some examples of the method, serving network entities, and non-transitory computer-readable medium described herein, the physical environment may be represented in the DT model by predicted locations of the UE based on RSRP values or CIR values at the UE with respect to other components of the physical environment and the other components of the physical environment include the serving network entity and the target network entity.

In some examples of the method, serving network entities, and non-transitory computer-readable medium described herein, the physical environment may be represented in the DT model by predicted trajectories of the UE based on a history of RSRP values and associated timestamps at the UE with respect to other components of the physical environment and the other components of the physical environment include the serving network entity and the target network entity.

In some examples of the method, serving network entities, and non-transitory computer-readable medium described herein, the physical environment may be represented in the DT model by predicted future RSRP values at the UE based on predicted trajectories of the UE and predicted coverage distribution at the UE.

In some examples of the method, serving network entities, and non-transitory computer-readable medium described herein, the DT model may be associated with specific DT model capabilities and the DT model capabilities include one or more supported RSRP measurement filtering types, an RSRP measurements history size, a maximum time interval during which future RSRP values may be predicted, or combinations thereof.

Some examples of the method, serving network entities, and non-transitory computer-readable medium described herein may further include operations, features, means, or instructions for transmitting, to a DTMF, an indication of the handover preparation condition monitoring period, the RSRP measurements size supported by the DT model, the one or more supported RSRP measurement filtering types of the DT model, or combinations thereof.

Some examples of the method, serving network entities, and non-transitory computer-readable medium described herein may further include operations, features, means, or instructions for receiving an indication that, when the DT model may be at a DTMF, that the first handover condition may be expected to be satisfied during one or more future instances of the handover preparation condition monitoring period.

In some examples of the method, serving network entities, and non-transitory computer-readable medium described herein, transmitting the configuration information may include operations, features, means, or instructions for transmitting a request to report a history of latest received RSRP values in support of the DT model, where the request specifies that the history may be for a single cell, for all neighbor cells to the UE, or for a limited quantity of cells having strongest RSRP values.

In some examples of the method, serving network entities, and non-transitory computer-readable medium described herein, the configuration information that may be indicative that the UE may be to transmit the handover-associated measurement report before expiration of the handover preparation condition monitoring period may be indicated as a preparation monitoring time fraction and the preparation monitoring time fraction may be expressed as a fraction of the handover preparation condition monitoring period or as a quantity of times the first handover condition may be to be satisfied during the handover preparation condition monitoring period.

Some examples of the method, serving network entities, and non-transitory computer-readable medium described herein may further include operations, features, means, or instructions for transmitting, to a DTMF, an indication of a preparation prediction time fraction that may be associated with a preparation monitoring time fraction, where the preparation prediction time fraction may be expressed as a fraction of the handover prediction condition monitoring period.

In some examples of the method, serving network entities, and non-transitory computer-readable medium described herein, the configuration information may be further indicative that the UE may be to transmit the handover-associated measurement report before expiration of a handover execution condition monitoring period by an execution monitoring time fraction and the execution monitoring time fraction may be expressed as a fraction of the handover execution condition monitoring period or as a quantity of times a second handover condition may be to be satisfied during the handover execution condition monitoring period.

DETAILED DESCRIPTION

Figure 1:
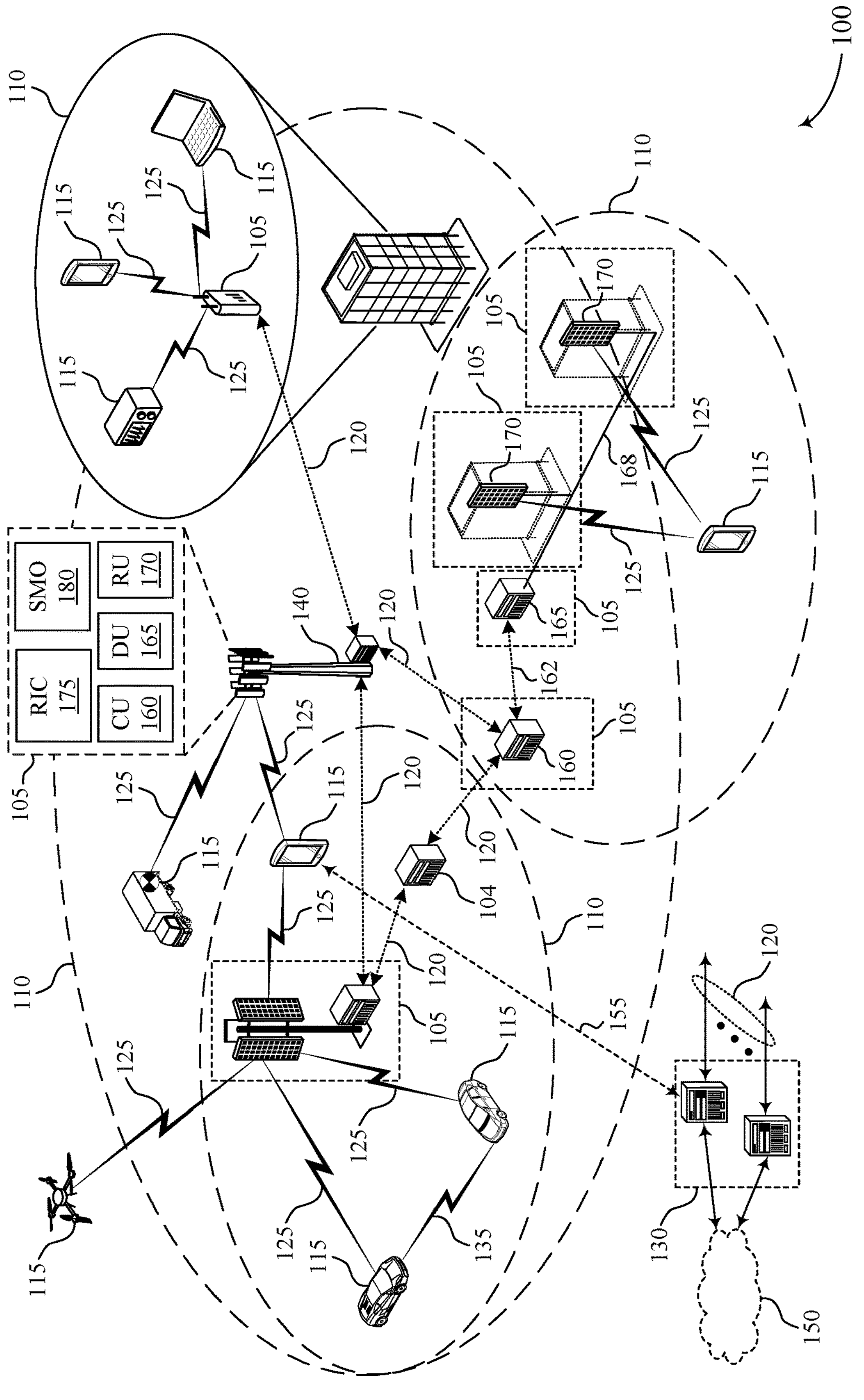
FIG. 1 shows an example of a wireless communications system that supports digital twin assisted handover through digital twin prediction in accordance with one or more aspects of the present disclosure.

In some wireless communication systems, a network entity may instruct a user equipment (UE) to participate in a handover operation where the UE switches from communicating with a serving cell to a target cell. For example, the UE may measure a reference signal received power (RSRP) (e.g., signal strength) of each beam of the serving cell and the target cell, and the UE may monitor the beams for meeting a handover preparation condition during a handover preparation condition monitoring period to participate in the handover operation. In some examples, the handover preparation condition may be met when the RSRP of the serving cell is less than the RSRP of the target cell during the handover preparation condition monitoring period. The UE may report the measurements to the serving cell after the handover preparation condition monitoring period, the serving cell may initiate the handover operation to handover communications to the target cell, and the UE may be reconfigured by the serving cell to communicate with the target cell. However, the UE performing measurements for the entire handover condition monitoring period as part of the handover operation procedures may result in delay and handover latency.

The described techniques relate to improved methods, systems, devices, and apparatuses that support digital twin (DT) assisted handover through RSRP prediction. A DT model may be located at the UE, a serving cell, or at a DT management function (DTMF) associated with the network, that predicts RSRP values for beams used for communicating with the serving cell and one or more target cells. Using the DT model to predict RSRP values may facilitate the UE in transmitting a measurement report before expiration of a handover preparation condition monitoring period. For example, the UE may monitor for a first instance of satisfying a handover preparation condition to send the measurement report, such that the measurement report is sent before expiration of a handover preparation condition monitoring period. In examples where the DT model is located at the DTMF, the UE may send the measurement report directly to the DTMF or to the serving cell to forward to the DTMF, and the DTMF may predict the RSRPs of the beams. In examples where the DT model is located at the serving cell, the UE may send the measurement report to the serving cell and the serving cell may predict the RSRPs. In examples where the DT model is located at the UE, the UE may predict the RSRP values after the first instance of fulfillment of the handover preparation condition. The UE may send the measurement report to the serving cell if the predicted RSRP values would satisfy the handover preparation condition for the rest of the handover preparation condition monitoring period, and the serving cell may facilitate the handover operation. The DT assisted handover may reduce delay and handover latency, for example, that may otherwise be associated with the UE monitoring the handover preparation condition for the entire handover preparation condition monitoring period.

Aspects of the disclosure are initially described in the context of wireless communications systems. Aspects of the disclosure are further illustrated by and described with reference to apparatus diagrams, system diagrams, and flowcharts that relate to DT assisted handover through RSRP prediction.

FIG. 1 shows an example of a wireless communications system 100 that supports DT assisted handover through RSRP prediction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support DT assisted handover through RSRP prediction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Additionally, in some wireless communication systems, a network entity may instruct the UE 115 to participate in a handover operation where the UE 115 switches from communicating with a serving cell to a target cell. For example, the UE 115 may measure a RSRP (e.g., signal strength) of each beam of the serving cell and the target cell, and the UE 115 may monitor the beams for meeting a handover preparation condition during a handover preparation condition monitoring period to participate in the handover operation. In some examples, the handover preparation condition may be met when the RSRP of the serving cell is less than the RSRP of the target cell during the handover preparation condition monitoring period. The UE 115 may report the measurements to the serving cell after the handover preparation condition monitoring period, the serving cell may initiate the handover operation to handover communications to the target cell, and the UE 115 may be reconfigured by the serving cell to communicate with the target cell. However, the UE 115 performing measurements for the entire handover condition monitoring period as part of the handover operation procedures may result in delay and handover latency.

As discussed herein, a DT model may assist in the handover operation by providing RSRP prediction. A DT model may be located at the UE 115, a serving cell, or at a DTMF associated with the network, that predicts RSRP values for beams used for communicating with the serving cell and one or more target cells. Using the DT model to predict RSRP values may facilitate the UE 115 in transmitting a measurement report before expiration of a handover preparation condition monitoring period. For example, the UE 115 may monitor for a first instance of satisfying a handover preparation condition to send the measurement report, such that the measurement report is sent before expiration of a handover preparation condition monitoring period. In examples where the DT model is located at the DTMF, the UE 115 may send the measurement report directly to the DTMF or to the serving cell to forward to the DTMF, and the DTMF may predict the RSRPs of the beams. In examples where the DT model is located at the serving cell, the UE 115 may send the measurement report to the serving cell and the serving cell may predict the RSRPs. In examples where the DT model is located at the UE 115, the UE 115 may predict the RSRP values after the first instance of fulfillment of the handover preparation condition. The UE 115 may send the measurement report to the serving cell if the predicted RSRP values would satisfy the handover preparation condition for the rest of the handover preparation condition monitoring period, and the serving cell may facilitate the handover operation. The DT assisted handover may reduce delay and handover latency, for example, that may otherwise be associated with the UE monitoring the handover preparation condition for the entire handover preparation condition monitoring period.

The DT is technology that provides modelling and transforming complex real or physical systems into a digital replica. The DT replica may be used to analyze, monitor, optimize and predict the performance of the physical system (e.g., RSRPs of beams). DT technologies may be applied to wireless communication network frameworks, for example, in 6G technology. As discussed herein, DT assisted handover and signaling may involve handover decisions that are based on a DT model of the network. Using the DT assisted handover may facilitate low handover latency and reduced quantity of radio link failures (RLF).

In some examples, a UE 115 may be configured by the serving cell to measure RSRP of $P_{RSRPc,b}$ (n) (in decibel-milliwatts (dBm)) at a discrete time instant n from each beam $b \in B$ of cell $c \in C$, using the synchronization signal block (SSB) bursts transmitted by each cell. The UE 115 may constantly monitor the handover preparation condition (e.g., configured by a measurement configuration message from the serving cell), where the preparation condition is fulfilled for the preparation condition is based on the following parameters:

$$P_{c0}(m) < P_{c'}(m) + o_{c0,c'}^{prep}, \text{ for } m_{prep} - T_{prep} < m < m_{prep}$$

where $$o_{c0,c'}^{prep}$$

is the conditional handover (CHO) preparation offset between the serving cell, c0, and the target cell, c'. The UE 115 may send a measurement report to the serving cell, c0, at time, $m=m_{prep}$, if the preparation condition is fulfilled for the preparation condition monitoring time, $T_{prep}$. The serving cell, c, may send a handover request message to the prepared target cell, c'. The target cell, c', may perform admission control and send an indication of an acknowledge (ACK) of the handover request to the serving cell.

The serving cell, c0, may send a reconfiguration message to the UE 115 and the UE may add the serving cell to its prepared cell list. The UE 115 acknowledge the reconfiguration with a reconfiguration complete message sent to the serving cell. The UE 115 may continue its connectivity to the serving cell but also constantly monitor the CHO execution condition using the following equation:

$$P_{c0}(m) + o_{c0,c'}^{exec} < P_{c'}(m), \text{ for } m_{exec} - T_{exec} < m < m_{exec}$$

for all the prepared target cells. When the execution condition is fulfilled for any one or more target cells, the UE 115 may detach from the serving cell (e.g., network entity, gNB 0) and initiate a handover using random access towards the target cell, c'. Upon completion of a successful handover, the target cell may send an ACK message to the serving cell.

As discussed herein, a DT assisted handover method and signaling where handover decisions are taken, may be based on a DT model of the network. The DT model may be located at the network (e.g., network-based handover, such as a cell or managing function) or at the UE 115 (UE-based handover). Using the DT assisted handover may result to in relatively lower handover latency and reduced quantity of RLFs.

In some examples, the DT may represent or model a network of a single gNB-CU connected to multiple gNB-DUs (e.g., cells). The DT may model the physical environment in which the cells are deployed. In addition, the DT may also model the different components of the wireless system, such as transmission and reception points (TRPs) transmission power and antennas radiation pattern, and radiation pattern and noise figure of antennas of the UE 115. Based on the DT's modelling of the system's physical environment and wireless components, the DT may apply ray tracing techniques and predicts full RF coverage distributions of each cell (e.g., an RF-aware DT model).

The RF coverage distributions of each cell may be defined in terms of various inputs and outputs. For example, one representation or mapping of the coverage distribution at the DT model may include predicting RSRP values (in dBm) at the UE 115 for beams from each of the cells based on the location of the UE 115. Also, a DT model may predict the channel for the beams from each of the cells (e.g., in terms of multipath gains, phases, and delays, channel impulse response (CIR), etc.) to the UE based on the location of the UE 115.

In some examples, based on coverage maps associated with each of the cells, the DT model may predict a UE location given RSRP values (or CIRs) received at the UE from a subset of cells. Moreover, a DT model may also predict a n RSRP trajectory measured by the UE 115 based on a history of size of the power (W) of RSRP values and timestamps measured at the UE 115 from a subset of cells. An $RSRP_{vec-i}$ is a vector of size W of RSRP values received at the UE from cell; at time instances indicated by the values in the vector $T_{vec-i}$, i=0, 1, . . . , M. The DT model may predict trajectory of the UE 115 based on the $RSRP_{vec-i}$.

When combining trajectory prediction with coverage distribution information, a prediction of future RSRP values may be implemented using the DT model, as discussed with respect to FIGS. 3-7. In a first example, the DT enabled signal prediction may occur using a DT model at the DTMF, where the DTMF is a component of a RAN intelligent controller (RIC). In a second example, the DT enabled signal prediction may occur using a DT model at the serving gNB (e.g., serving cell). In a third example, the DT enabled signal prediction may occur using a DT model at the UE 115

Figure 2:
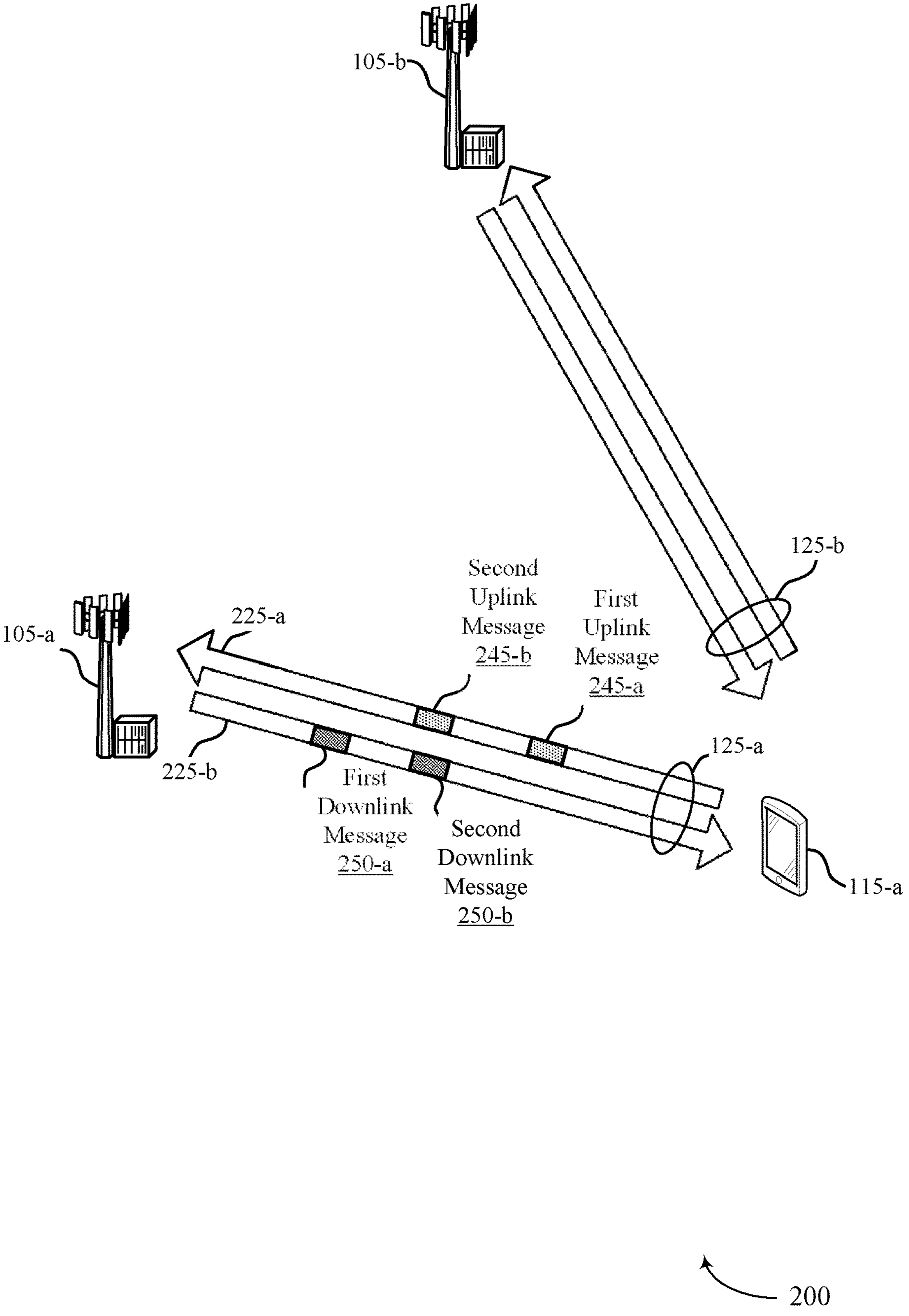
FIG. 2 shows an example of a wireless communications system that supports digital twin assisted handover through reference signal received power prediction in accordance with one or more aspects of the present disclosure.

FIG. 2 shows an example of a wireless communications system 200 that supports DT assisted handover through RSRP prediction in accordance with one or more aspects of the present disclosure. The wireless communications system 200 may implement aspects of or may be implemented by aspects of the wireless communications system 100. For example, the wireless communications system 200 includes a UE 115-*a*, a serving network entity 105-*a*, and a target network entity 105-*c*, which may be examples of a UE 115 and a network entity 105 described with respect to FIG. 1.

In the wireless communications system 200, the UE 115-*a* may communicate with a serving network entity 105-*a*. For example, the serving network entity 105-*a* may communicate with the UE 115-*a* using a first communication link 125-*a*. In some examples, the first communication link 125-*a* may include a first channel 225-*a* for transmitting data from the UE 115-*a* to the serving network entity 105-*a* and a second channel 225-*b* for transmitting data from the serving network entity 105-*a* to the UE 115-*a*. The first communication link 125-*a* may be an example of an NR or LTE link between the UE 115-*a* and the serving network entity 105-*a*. The first communication link 125-*a* may include a bi-directional link that enables both uplink and downlink communications, for example, via the channels 225. For example, the UE 115-*a* may transmit uplink messages 245 (e.g., uplink transmissions), such as uplink control signals or uplink data signals, to the serving network entity 105-*a* using the first channel 225-*a* (e.g., of the communication link 125) and the serving network entity 105-*a* may transmit downlink messages 250 (e.g., downlink transmissions), such as downlink control signals or downlink data signals, to the UE 115-*a* using the second channel 225-*b* (e.g., of the communication link 125). In some examples, UE 115-*a* may also communicate with a target network entity 105-*b*, for example, in anticipation of or after a handover operation. Accordingly, the UE 115-*a* may communicate with the target network entity 105-*b* using a second communication link 125-*b*, which may be or operate similar to the communication link 125-*a* (e.g., provide bi-directional communication using channels 225).

The UE 115-*a* may receive, for example, in a first downlink message 250-*a*, configuration information indicative of a first handover condition for handover of the UE 115-*a* from the serving network entity 105-*a* to the target network entity 105-*b*. The configuration information may also indicate a handover preparation condition monitoring period and that the UE 115-*a* is to transmit a handover-associated measurement report before expiration of the handover preparation condition monitoring period based on satisfaction of the first handover condition during the handover preparation condition monitoring period. The transmission of the report before the expiration of the handover preparation condition monitoring period is based on application of a DT model.

The UE 115-*a* may transmit, for example, in a first uplink message 245-*a*, before expiration of the handover preparation condition monitoring period, the handover-associated measurement report based on the satisfaction of the first handover condition during the handover preparation condition monitoring period. In some examples, the DT model may be at one of the serving network entity 105-*a* or a DTMF. In some examples, the handover-associated measurement report may be transmitted to the DTMF (e.g., directly from UE 115-*a*) associated with the serving network entity 105-*a* and the target network entity 105-*b*.

The UE 115-*a* may participate in a handover operation for handover of the UE 115-*a* from the serving network entity 105-*a* to the target network entity 105-*b* based on transmission of the handover-associated measurement report. In some examples, the UE 115-*a* may determine, using a DTMF at the UE 115-*a*, that the first handover condition is expected to be satisfied during one or more future instances of the handover preparation condition monitoring period. The handover-associated measurement report may be transmitted based on an expectation that the first handover condition is to be satisfied during the handover preparation condition monitoring period.

In some examples, the UE 115-*a* may receive a reconfiguration message, for example, in a second downlink message 250-*b*, in response to transmission of the handover-associated measurement report. The UE 115-*a* may transmit, for example, in a second uplink message 245-*b*, an indication of a reconfiguration acknowledgement to confirm receiving the reconfiguration. The UE 115-*a* may monitor for satisfaction of a second handover condition during a handover execution condition monitoring period that is after receipt of the reconfiguration message. The UE 115-*a* may initiate random access with the target network entity 105-*b* as part of the handover operation, where initiation of the random access is before expiration of the handover execution condition monitoring period and is based on satisfaction of the second handover condition during the handover execution condition monitoring period.

In some examples, the UE 115-*a* may determine, based on satisfaction of the second handover condition during the handover execution condition monitoring period and using the DT model at the UE 115-*a*, that the second handover condition is expected to be satisfied during one or more future instances of the handover execution condition monitoring period. The random access with the target network entity 105-*b* may be initiated based on an expectation that the second handover condition is to be satisfied during the handover execution condition monitoring period. In some examples, the DT model may be representative of a physical environment associated with the UE 115-*a*, the serving network entity 105-*a*, and the target network entity 105-*b*.

In some examples, the DT model is further representative of an antenna radiation pattern associated with the UE 115-*a*, noise patterns associated with the UE 115-*a*, transmission power patterns associated with the serving network entity 105-*a*, transmission power patterns associated with the target network entity 105-*b*, RF coverage associated with the serving network entity 105-*a* and the target network entity 105-*b*, ray tracing associated with the serving network entity 105-*a*, the target network entity 105-*b*, and/or the UE 115-*a*. The physical environment may be represented in the DT model by predicted RSRP values at the UE 115-*a* with respect to other components of the physical environment, or by predicted values that define a channel, at the UE 115-*a*, with respect to the other components of the physical environment, where the other components of the physical environment include the serving network entity 105-*a* and the target network entity 105-*b*.

The physical environment may be represented in the DT model by predicted locations of the UE 115-*a* based on RSRP values or CIR values at the UE 115-*a* with respect to other components of the physical environment, where the other components of the physical environment include the serving network entity 105-*a* and the target network entity 105-*b*. The physical environment may be represented in the DT model by predicted trajectories of the UE 115-*a* based on a history of RSRP values and associated timestamps at the UE 115-*a* with respect to other components of the physical environment, where the other components of the physical environment include the serving network entity 105-*a* and the target network entity 105-*b*. The physical environment may be represented in the DT model by predicted future RSRP values at the UE 115-*a* based on predicted trajectories of the UE 115-*a* and predicted coverage distribution at the UE 115-*a*. The DT model may be associated with specific DT model capabilities, where the DT model capabilities include one or more supported RSRP measurement filtering types, an RSRP measurements history size, a maximum time interval during which future RSRP values are predicted, or combinations thereof.

In some examples, the UE 115-*a* may receive a request to report a history of latest RSRP values in support of the DT model, where the request specifies that the history is for a single cell, for all neighbor cells, or for a limited quantity of cells having strongest RSRP values. The configuration information that is indicative that the UE 115-*a* is to transmit the handover-associated measurement report before expiration of the handover preparation condition monitoring period may be indicated as a preparation monitoring time fraction. The preparation monitoring time fraction may be expressed as a fraction of the handover preparation condition monitoring period or as a quantity of times the first handover condition is to be satisfied during the handover preparation condition monitoring period. In some examples, the configuration information may be further indicative that the UE 115-*a* is to transmit the handover-associated measurement report before expiration of a handover execution condition monitoring period by an execution monitoring time fraction, where the execution monitoring time fraction is expressed as a fraction of the handover execution condition monitoring period or as a quantity of times a second handover condition is to be satisfied during the handover execution condition monitoring period.

Figure 3:
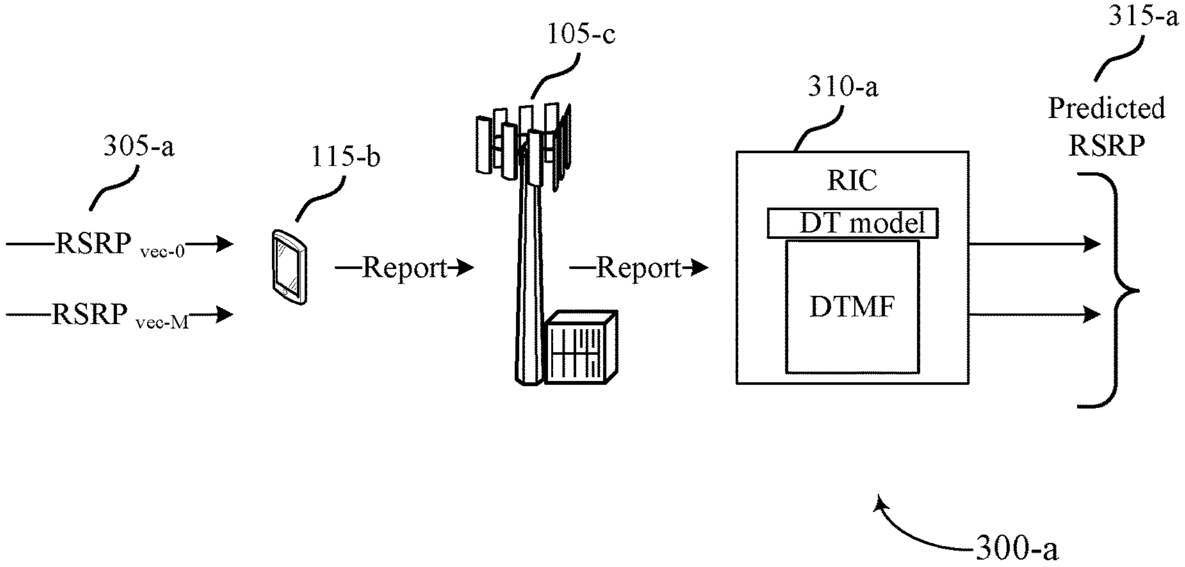
FIG. 3 shows an example of a handover procedure that supports digital twin assisted handover through reference signal received power prediction in accordance with one or more aspects of the present disclosure.
Figure 3:
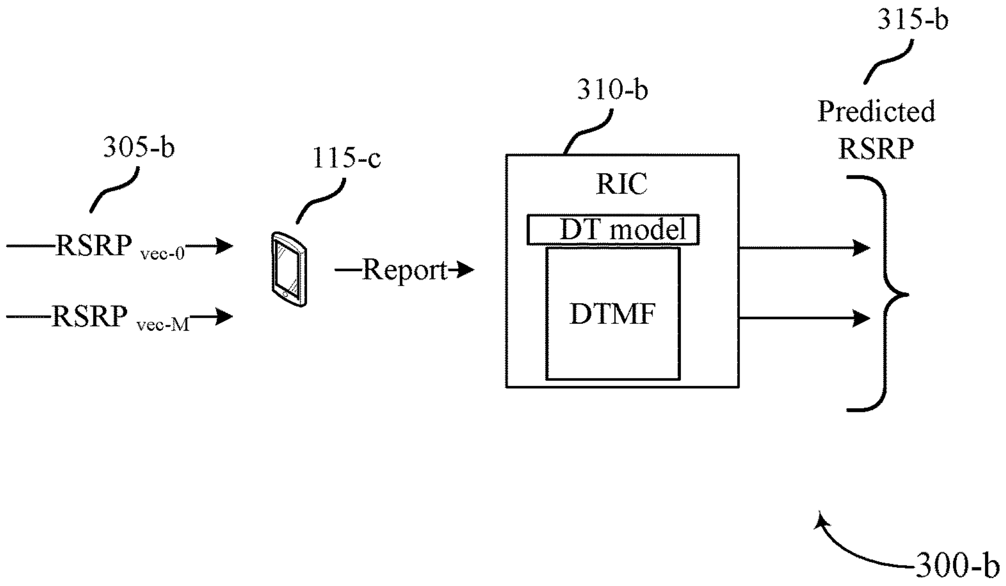

FIG. 3 shows an example of a handover procedure 300 that supports DT assisted handover through RSRP prediction in accordance with one or more aspects of the present disclosure. The handover procedure 300 may include a first handover procedure 300-*a* and a second handover procedure 300-*b* that include the DT model at the DTMF. The handover procedure 300 may implement aspects of or may be implemented by aspects of the wireless communications system 100. For example, the handover procedure 300 involve a UE 115-*b*, UE 115-*c*, serving network entity 105-*c*, DTMF 310-*a*, and DTMF 310-*b*, which may be examples of a UE 115 and a network entity 105 described with respect to FIG. 1.

In the first handover procedure 300-*a*, the DT model at the DTMF may receive measurement reporting via the serving network entity 105-*c*. For the first handover procedure 300-*a*, the UE 115-*b* may measure (e.g., inputs) RSRP values 305-*a* for beams associated with the serving network entity 105-*c* and one or more target network entities 105 (e.g., $RSRP_{vec\text{-}0}$ through $RSRP_{vec\text{-}M}$ for beam vectors 0 through M, where M is greater than 1). If one or more handover preparation conditions are satisfied based on the RSRP values 305-*a*, the UE 115-*b* may send a measurement report to the serving network entity 105-*c* with the measured RSRP values. The serving network entity 105-*c* may forward the report to the DTMF 310-*a* of the RIC. The DTMF 310-*a* includes the DT model, which is used to provide predicted RSRPs 315-*a* that indicate whether the future RSRP values will satisfy the handover preparation condition for the handover preparation condition monitoring period. Based on the predicted RSRPs 315-*a*, the serving network entity 105-*c* may initiate the handover operation for the UE 115-*b* to switch to communicating with the target network entity 105.

In the second handover procedure 300-*b*, the DT model at the DTMF may receive measurement reporting via the UE 115-*c* (e.g., without the serving network entity 105 relaying the report). For the second handover procedure 300-*b*, the UE 115-*c* may measure (e.g., inputs) RSRP values 305-*b* for beams associated with the serving network entity 105 and one or more target network entities 105 (e.g., $RSRP_{vec\text{-}0}$ through $RSRP_{vec\text{-}M}$ for beam vectors 0 through M, where M is greater than 1). If one or more handover preparation conditions are satisfied based on the RSRP values 305-*b*, the UE 115-*c* may send a measurement report to the DTMF 310-*b* of the RIC. The DTMF 310-*b* includes the DT model, which is used to provide predicted RSRPs values 315-*b* that indicate whether the future RSRP values will satisfy the handover preparation conditions for the handover preparation condition monitoring period. Based on the predicted RSRPs values 315-*b*, the serving network entity 105 may initiate the handover operation for the UE 115-*c* to switch to communicating with the target network entity 105.

Figure 4:
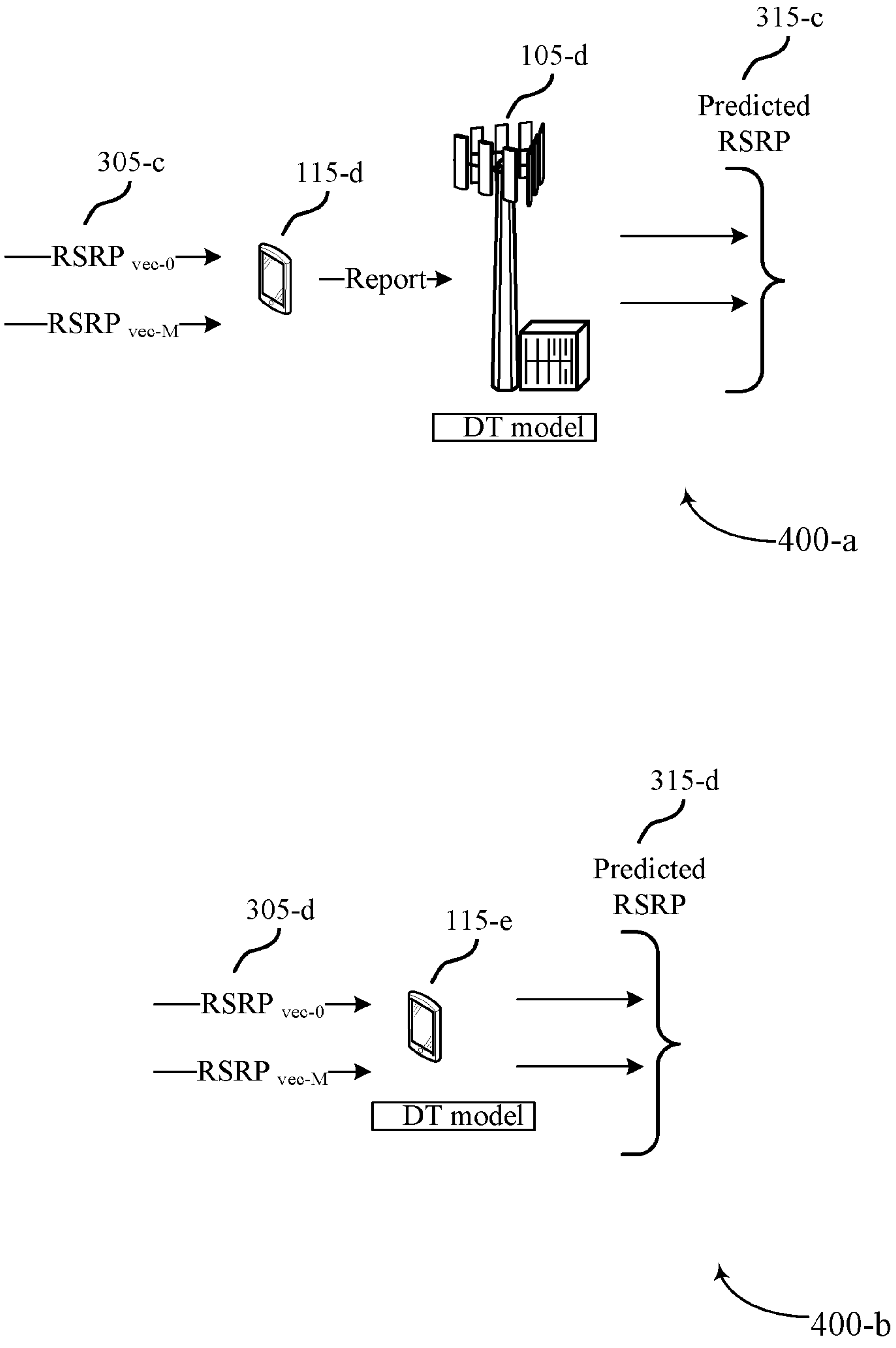
FIG. 4 shows an example of a handover procedure that supports digital twin assisted handover through reference signal received power prediction in accordance with one or more aspects of the present disclosure.

FIG. 4 shows an example of a handover procedure 400 that supports DT assisted handover through RSRP prediction in accordance with one or more aspects of the present disclosure. The handover procedure 400 may include a first handover procedure 400-*a* that includes the DT model at the serving network entity 105 and a second handover procedure 400-*b* that include the DT model at the UE 115. The handover procedure 400 may implement aspects of or may be implemented by aspects of the wireless communications system 100. For example, the handover procedure 400 involve a UE 115-*d*, UE 115-*c*, and serving network entity 105-*d*, which may be examples of a UE 115 and a network entity 105 described with respect to FIG. 1.

In the first handover procedure 400-*a*, the DT model at the serving network entity 105-*d* may receive measurement reporting via the UE 115-*d*. For the first handover procedure 400-*a*, the UE 115-*d* may measure (e.g., inputs) RSRP values 305-*c* for beams associated with the serving network entity 105-*d* and one or more target network entities 105 (e.g., $RSRP_{vec\text{-}0}$ through $RSRP_{vec\text{-}M}$ for beam vectors 0 through M, where M is greater than 1). If one or more handover preparation conditions are satisfied based on the RSRP values 305-*c*, the UE 115-*d* may send a measurement report to the serving network entity 105-*c* with the measured RSRP values. The serving network entity 105-*d* includes the DT model, which is used to provide predicted RSRPs values 315-*c* that indicate whether the future RSRP values will satisfy the handover preparation condition for the handover preparation condition monitoring period. Based on the predicted RSRPs values 315-*c*, the serving network entity 105-*d* may initiate the handover operation for the UE 115-*d* to switch to communicating with the target network entity 105.

In the second handover procedure 400-*b*, the DT model at the UE 115-*e* may predict the RSRP values to facilitate the handover operation. For the second handover procedure 400-*b*, the UE 115-*e* may measure (e.g., inputs) RSRP values 305-*d* for beams associated with the serving network entity 105 and one or more target network entities 105 (e.g., $RSRP_{vec\text{-}0}$ through $RSRP_{vec\text{-}M}$ for beam vectors 0 through M, where M is greater than 1). If one or more handover preparation conditions are satisfied based on the RSRP values 305-*d*, the UE 115-*d* may predict the RSRP values 315-*d* using the DT model at the UE 115-*c*. The UE 115-*c* may send a measurement report to the serving network entity 105-*d* with the predicted RSRP values. The predicted RSRPs values 315—may indicate whether the future RSRP values will satisfy the handover preparation condition for the handover preparation condition monitoring period. Based on the predicted RSRPs values 315-*d*, the serving network entity 105 may initiate the handover operation for the UE 115-*e* to switch to communicating with the target network entity 105.

Figure 5:
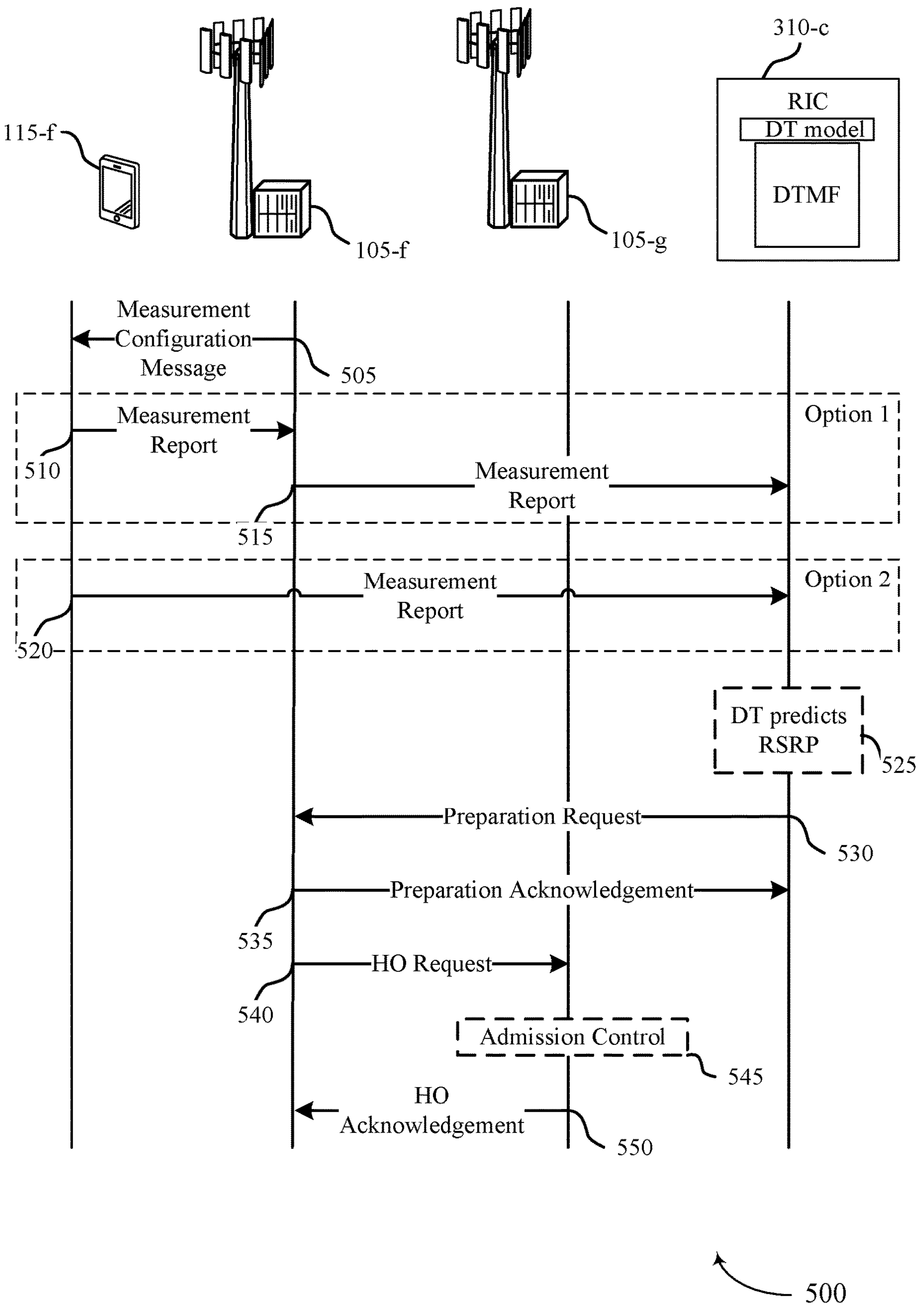
FIG. 5 shows an example of a process flow that supports digital twin assisted handover through reference signal received power prediction in accordance with one or more aspects of the present disclosure.

FIG. 5 shows an example of a process flow 500 that supports DT assisted handover through RSRP prediction in accordance with one or more aspects of the present disclosure. The process flow 500 may implement aspects of or may be implemented by aspects of the wireless communications system 100 or the wireless communications system 200. For example, the process flow of a handover procedure 300 may include a UE 115-*f*, a serving network entity 105-*f*, a target network entity 105-*g*, and a DTMF 310-*c*, which may be an example of a UE 115, a network entity 105, and a DTMF 310 as described herein. In the following description of the process flow 500, the operations performed by the UE 115-*f*, the serving network entity 105-*f*, the target network entity 105-*g*, and the DTMF 310-*c* may be performed in different orders or at different times than the exemplary order shown. Some operations may also be omitted from the process flow 500, or other operations may be added to the process flow 500. Further, while operations in the process flow 500 are illustrated as being performed by the UE 115-*f*, the serving network entity 105-*f*, the target network entity 105-*g*, and the DTMF 310-*c*, the examples herein are not to be construed as limiting, as the described features may be associated with any quantity of different devices.

At 505, the UE 115-*f* may be configured by the serving network entity 105-*f* to measure the raw RSRP $P_{RSRPc,b}$ (n) (in dBm) at a discrete time instant n from each beam b∈B of cell c∈C, using the SSB bursts transmitted by each of the serving network entity 105-*f* and the target network entity 105-*g*. The UE 115-*f* may constantly monitor the preparation condition based on the following condition (configured by the measurement configuration message):

$$P_{c0}(m) < P_{c'}(m) + o_{c0,c'}^{prep}$$

where $$o_{c0,c'}^{prep}$$

is defined as the conditional handover preparation offset between the serving network entity 105-*f* and the target network entity 105-*g*. Once the preparation condition is fulfilled one instance, such that the UE 115-*f* does not wait for the preparation condition monitoring time ($T_{prep}$), the UE 115-*f* may, at 510, send a measurement report to serving network entity 105-*f* (Option 1). At 515, the serving network entity 105-*f* may forward the measurement report to the DTMF 310-*c*. Alternatively, the UE 115-*f*, at 520 (Option 2), may directly send the measurement report to DTMF 310-*c*. At 525, the DTMF 310-*c* may use the DT to predict future RSRP measurements for the future time interval $T_{prep}$.

If the predicted RSRP levels satisfy the preparation condition for the future $T_{prep}$ time interval, at 530, the DTMF 310-*c* may send a preparation request to the serving network entity 105-*f* including the target network entity ID of the target network entity 105-*g*. At 535, the serving network entity 105-*f* may send a preparation acknowledgement to the DTMF 310-*c*. At 540, the serving network entity 105-*f* may send a handover request to the target network entity 105-*g*. At 545, the target network entity 105-*g* may perform an admission control and acknowledge of the handover request, and at 550, the target network entity 105-*g* may transmit a message indicating acknowledgement of the request to switch to the target network entity 105-*g* and the handover operation may subsequently occur.

Figure 6:
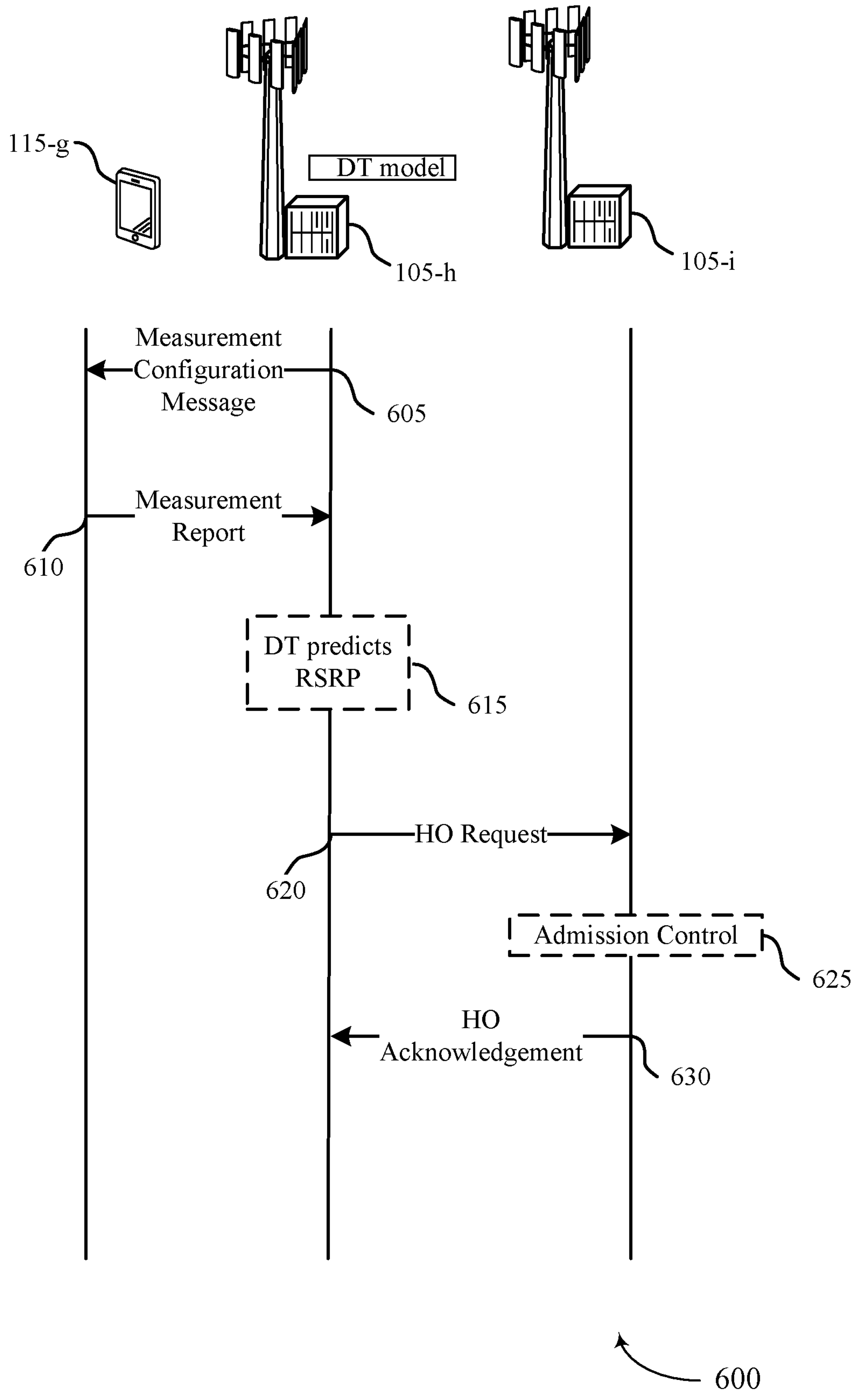
FIG. 6 shows an example of a process flow that supports digital twin assisted handover through reference signal received power prediction in accordance with one or more aspects of the present disclosure.

FIG. 6 shows an example of a process flow 600 that supports DT assisted handover through RSRP prediction in accordance with one or more aspects of the present disclosure. The process flow 600 may implement aspects of or may be implemented by aspects of the wireless communications system 100 or the wireless communications system 200. For example, the process flow 600 may include a UE 115-*g*, a serving network entity 105-*h*, and target network entity 105-*i*, which may be an example of a UE 115, a network entity 105, and a DTMF 310 as described herein. In the following description of the process flow 600, the operations performed by the UE 115-*g*, the serving network entity 105-*h*, and the target network entity 105-*i*, may be performed in different orders or at different times than the exemplary order shown. Some operations may also be omitted from the process flow 600, or other operations may be added to the process flow 600. Further, while operations in the process flow 600 are illustrated as being performed by the UE 115-*g*, the serving network entity 105-*h*, and the target network entity 105-*i*, the examples herein are not to be construed as limiting, as the described features may be associated with any quantity of different devices.

At 605, the UE 115-*g* may be configured by the serving network entity 105-*h* to measure the raw RSRP $P_{RSRPc,b}$ (n) (in dBm) at a discrete time instant n from each beam b∈B of cell c∈C, using the SSB bursts transmitted by each of the serving network entity 105-*h* and the target network entity 105-*i*. The UE 115-*g* may constantly monitor the preparation condition based on the following condition (configured by the measurement configuration message):

$$P_{c0}(m) < P_{c'}(m) + o_{c0,c'}^{prep}$$

where $$o_{c0,c'}^{prep}$$

is defined as the conditional handover preparation offset between the serving network entity 105-*h* and the target network entity 105-*i*. Once the preparation condition is fulfilled one instance, such that the UE 115-*g* does not wait for the preparation condition monitoring time ($T_{prep}$), the UE 115-*g* may, at 610, send a measurement report to serving network entity 105-*h*. At 615, the serving network entity 105-*f* may use the DT of the serving network entity 105-*f* to predict future RSRP measurements for the future time interval $T_{prep}$.

If the predicted RSRP levels satisfy the preparation condition for the future $T_{prep}$ time interval, at 620, the serving network entity 105-*f* may send a handover request to the target network entity 105-*i*. At 625, the target network entity 105-*i* may perform an admission control and acknowledge of the handover request, and at 630, the target network entity 105-*g* may transmit a message to the serving network entity 105-*h* indicating acknowledgement of the request to switch to the target network entity 105-*g* and the handover operation may subsequently occur.

Figure 7:
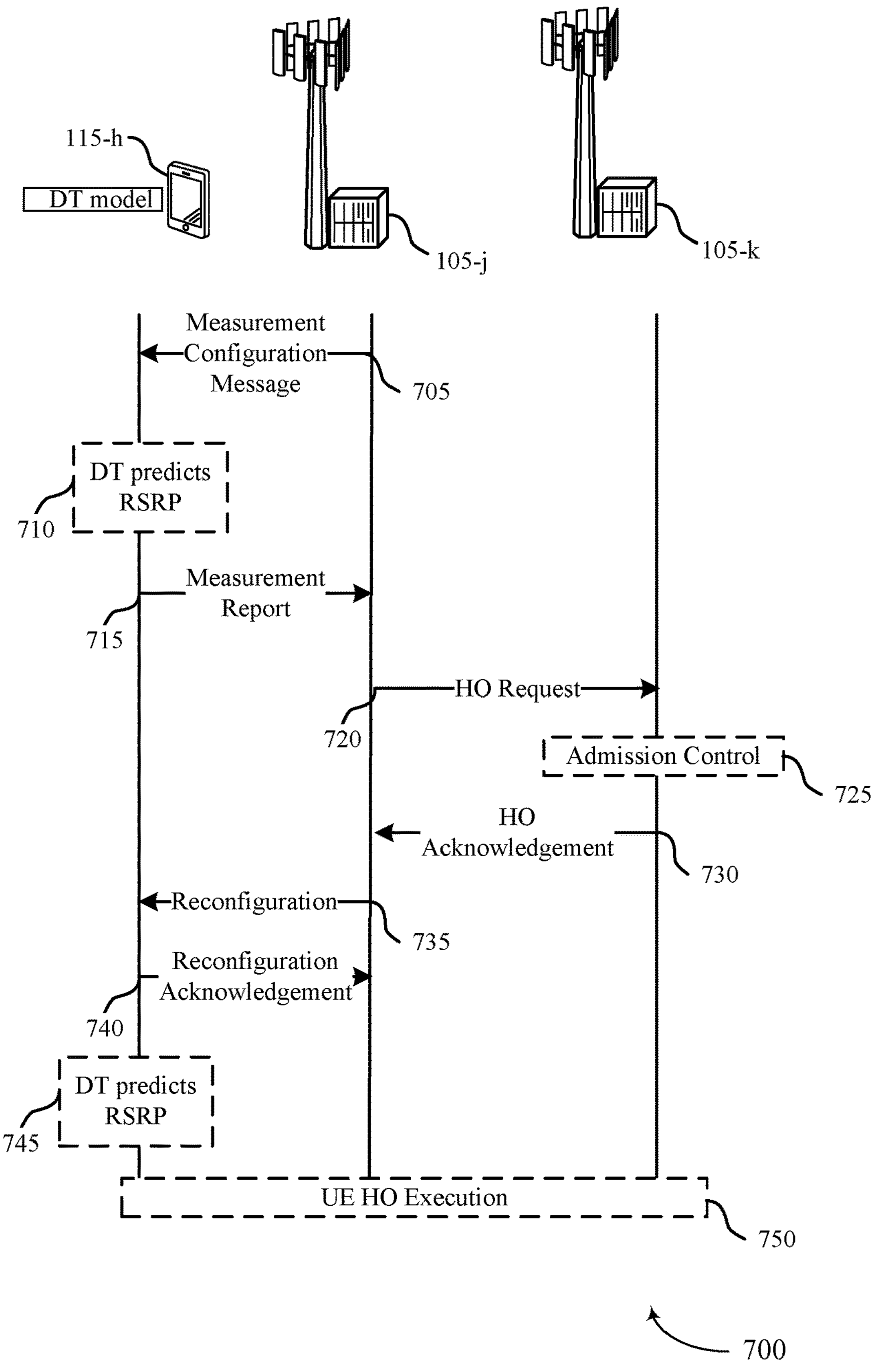
FIG. 7 shows an example of a process flow that supports digital twin assisted handover through reference signal received power prediction in accordance with one or more aspects of the present disclosure.

FIG. 7 shows an example of a process flow 700 that supports DT assisted handover through RSRP prediction in accordance with one or more aspects of the present disclosure. The process flow 700 may implement aspects of or may be implemented by aspects of the wireless communications system 100 or the wireless communications system 200. For example, the process flow 700 may include a UE 115-*h*, a serving network entity 105-*j*, and target network entity 105-*k*, which may be an example of a UE 115 and a network entity 105, as described herein. In the following description of the process flow 700, the operations performed by the UE 115-*h*, the serving network entity 105-*j*, and the target network entity 105-*k*, may be performed in different orders or at different times than the exemplary order shown. Some operations may also be omitted from the process flow 700, or other operations may be added to the process flow 700. Further, while operations in the process flow 700 are illustrated as being performed by the UE 115-*h*, the serving network entity 105-*j*, and the target network entity 105-*k*, the examples herein are not to be construed as limiting, as the described features may be associated with any quantity of different devices.

At 705, the UE 115-*h* may be configured by the serving network entity 105-*j* to measure the raw RSRP $P_{RSRPc,b}$ (n) (in dBm) at a discrete time instant n from each beam b∈B of cell c∈C, using the SSB bursts transmitted by each of the serving network entity 105-*j* and the target network entity 105-*k*. The UE 115-*h* may constantly monitor the preparation condition based on the following condition (configured by the measurement configuration message):

$$P_{c0}(m) < P_{c'}(m) + o_{c0,c'}^{prep}$$

where $$o_{c0,c'}^{prep}$$

is defined as the conditional handover preparation offset between the serving network entity 105-*j* and the target network entity 105-*k*. At 710, once the preparation condition is fulfilled one instance, such that the UE 115-*h* does not wait for the preparation condition monitoring time ($T_{prep}$), the UE 115-*g* may use the DT of the UE 115-*h* to predict future RSRP measurements for the future time interval $T_{prep}$.

If the predicted RSRP levels satisfy the preparation condition for the future $T_{prep}$ time interval, at 715, the UE 115-*h* may send a measurement report to the serving network entity 105-*j*. At 720, the serving network entity 105-*j* may sends a handover request message to the prepared target network entity 105-*k*. At 725, the target network entity 105-*k* may perform an admission control and acknowledge of the handover request, and at 730, the target network entity 105-*k* may transmit a message to the serving network entity 105-*j* indicating acknowledgement of the request to switch to the target network entity 105-*k*.

At 735, the serving network entity 105-*j* may send a reconfiguration message to the UE 115-*h* and the UE 115-*h* may add the serving network entity 105-*j* to its prepared network entity list. At 740, the UE 115-*h* may acknowledge the reconfiguration with a reconfiguration complete message transmitted to the serving network entity 105-*j*. The UE 115-*h* may continue its connectivity to the serving network entity 105-*h* but it may constantly monitors the conditional handover execution condition:

$$P_{c0}(m) + o_{c0,c'}^{exec} < P_{c'}(m)$$

for all the prepared target cells. At 745, when the execution condition is fulfilled for any network entity 105 once (e.g., does not wait for the execution condition monitoring time $T_{exec}$), the UE 115-*h* may use the DT to predict future RSRP measurements for the future time interval $T_{exec}$. At 750, if the predicted RSRP levels satisfy the execution condition for the future $T_{exec}$ time interval, the UE 115-*h* may detach from the serving network entity 105-*j* (gNB0) and initiate a handover using random access towards the target network entity 105-*k*. At the completion of a successful handover, the target network entity 105-*k* may send an acknowledgement to the serving network entity 105-*j*.

Accordingly, as discussed herein, within the measurement configuration message, the UE 115 may be configured to report a measurement to the serving cell once the preparation condition is met for one instance without waiting for the whole preparation time period, $T_{prep}$. Within the measurement configuration message, the UE 115 may also be configured to send measurement reports to the DTMF 310 directly if the DT model is available at the DTMF 310. Within the measurement configuration messaging, the UE 115 may be configured by the serving cell whether to activate or deactivate the DT model within the preparation and execution phases separately. In cases where the DT model is activated at the UE 115, the UE 115 may instantly trigger the handover by sending a measurement report to the serving network entity 105 based on the predicted RSRP values without waiting for the whole $T_{prep}$ time interval. The DTMF 310 may use a DT model to predict RSRP values for a future time interval $T_{prep}$. The DT model capabilities may include supported RSRP measurements filtering types, RSRP measurements history size supported as input to DT model, and greatest time interval in future for which DT model can predict RSRPs.

The prediction time interval $T_{prep}$, RSRP history window W, and filtering type, may be provided by the serving network entity 105 to the DTMF 310 after the DTMF 310 shares DT model capabilities with the serving network entity 105. The DTMF may send a preparation request to the serving network entity 105 indicating whether the predicted RSRP values meet the preparation condition for the future time interval $T_{prep}$. The preparation request may also include the target network entity ID of the target network entity 105.

Based on DT model capabilities, the serving network entity 105 may configure the UE 115 to report a history of size W of the latest received RSRP values. The reported history of RSRP values may include values for one network entity 105 (e.g., the network entity meeting the preparation condition only), all neighbor network entities 105, and the strongest RSRP network entities 105.

In some examples, when the DT is at the DTMF 310 or the serving network entity 105), the handover delay may be reduced by $T_{prep}$, and the handover delay may be reduced by $T_{prep}+T_{exec}$ when the DT is at the UE 115. In some examples, the UE 115 may monitor the preparation condition for a fraction of time $\alpha T_{prep}$ before sending a measurement report. In this case, the DT model may predict RSRP values for future $(1-\alpha)$ $T_{prep}$ time interval where $0<\alpha<1$. In some examples, the UE 115 may monitor the execution condition for a fraction of time $\beta T_{prep}$ before sending a measurement report, and the DT model may predict RSRP values for future $(1-\beta)$ $T_{exec}$ time interval where $0<\beta<1$. The total handover delay reduction may be $(1-\alpha)$ $T_{prep}$ for (e.g., when the DT is at the DTMF 310 or the serving network entity 105), and $(1-\alpha)$ $T_{prep}+(1-\beta)$ $T_{exec}$ (e.g., when the DT is at the UE 115).

Based on DT model capabilities, a preparation monitoring time fraction α may be provided to UE 115 within the measurement configuration message sent by the serving network entity 105. When the DT is at the DTMF 310, based on the DT Model capabilities, a preparation prediction time fraction $1-a$ may be provided to DTMF 310 by the serving cell. When the DT is at the serving network entity 105, DT model capabilities may be based on execution monitoring time fraction β that may be provided to UE 115 within the measurement configuration message sent by the serving network entity 105.

Figure 8:
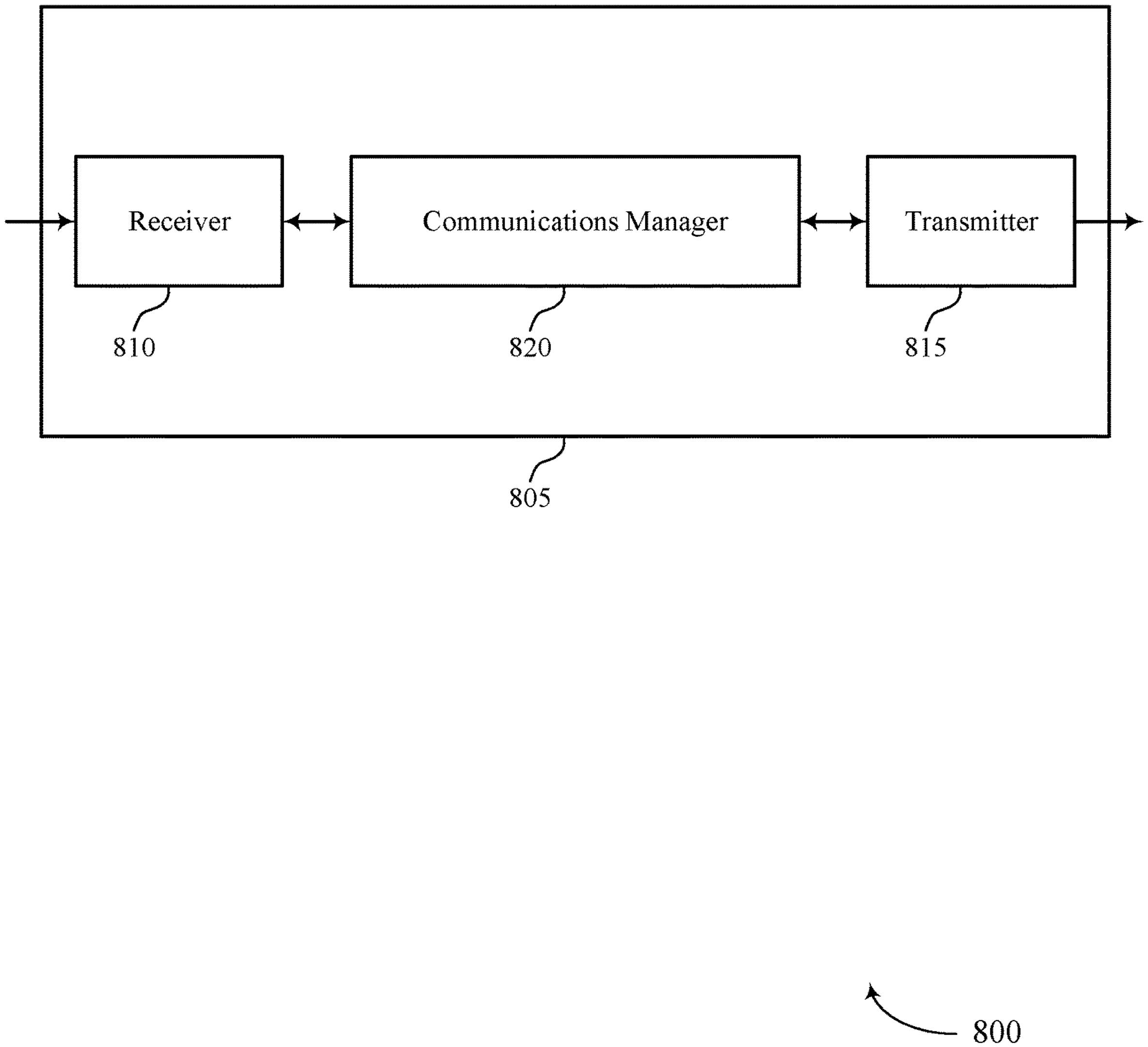
FIGS. 8 and 9 show block diagrams of devices that support digital twin assisted handover through reference signal received power prediction in accordance with one or more aspects of the present disclosure.

FIG. 8 shows a block diagram 800 of a device 805 that supports DT assisted handover through RSRP prediction in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to DT assisted handover through RSRP prediction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DT assisted handover through RSRP prediction). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of DT assisted handover through RSRP prediction as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The communications manager 820 is capable of, configured to, or operable to support a means for transmitting, before expiration of the handover preparation condition monitoring period, the handover-associated measurement report based on the satisfaction of the first handover condition during the handover preparation condition monitoring period. The communications manager 820 is capable of, configured to, or operable to support a means for participating in a handover operation for handover of the UE from the serving network entity to the target network entity based on transmission of the handover-associated measurement report.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reducing handover latency and RLFs.

Figure 9:
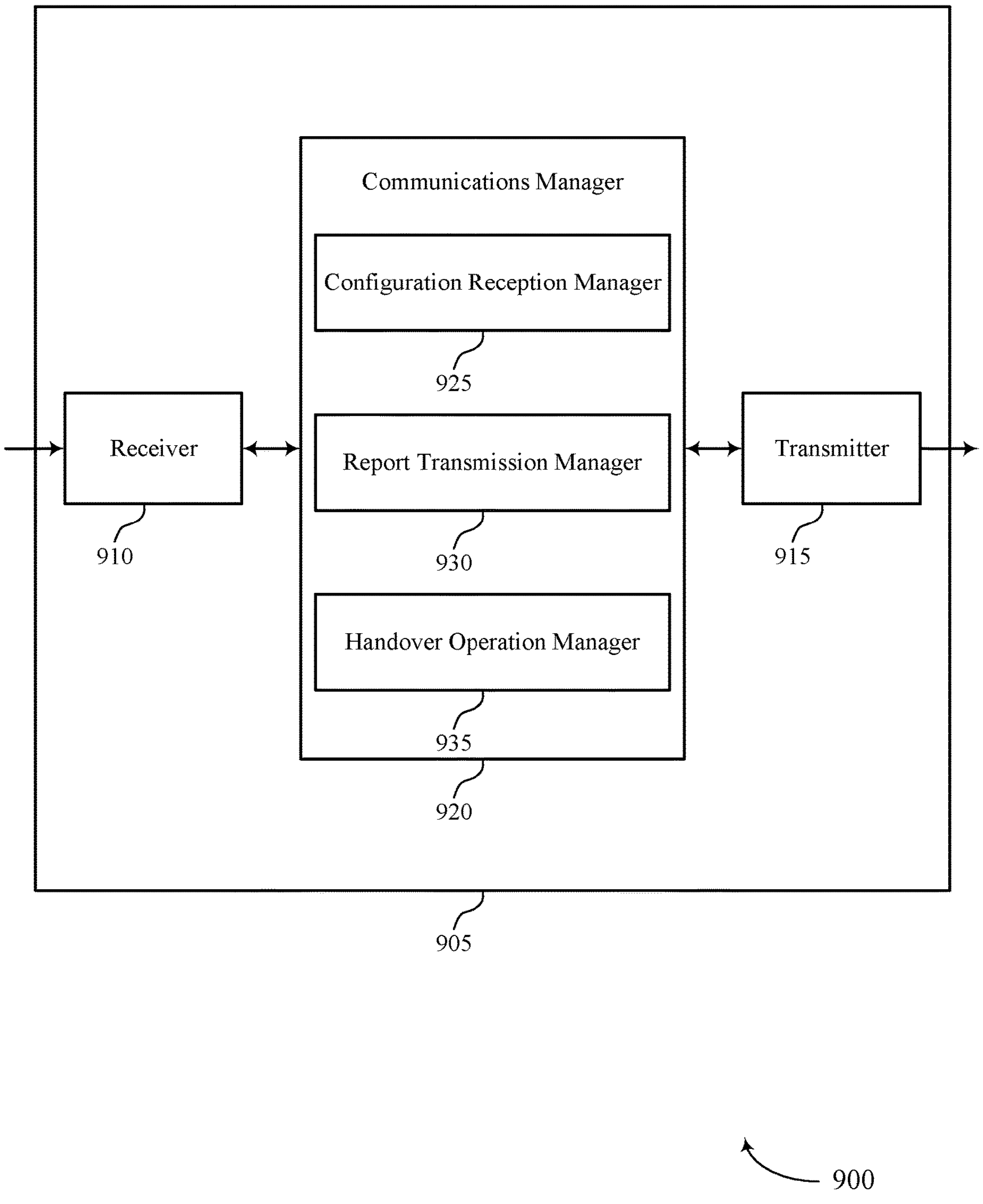

FIG. 9 shows a block diagram 900 of a device 905 that supports DT assisted handover through RSRP prediction in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to DT assisted handover through RSRP prediction). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to DT assisted handover through RSRP prediction). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of DT assisted handover through RSRP prediction as described herein. For example, the communications manager 920 may include a configuration reception manager 925, a report transmission manager 930, a handover operation manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The configuration reception manager 925 is capable of, configured to, or operable to support a means for receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The report transmission manager 930 is capable of, configured to, or operable to support a means for transmitting, before expiration of the handover preparation condition monitoring period, the handover-associated measurement report based on the satisfaction of the first handover condition during the handover preparation condition monitoring period. The handover operation manager 935 is capable of, configured to, or operable to support a means for participating in a handover operation for handover of the UE from the serving network entity to the target network entity based on transmission of the handover-associated measurement report.

Figure 10:
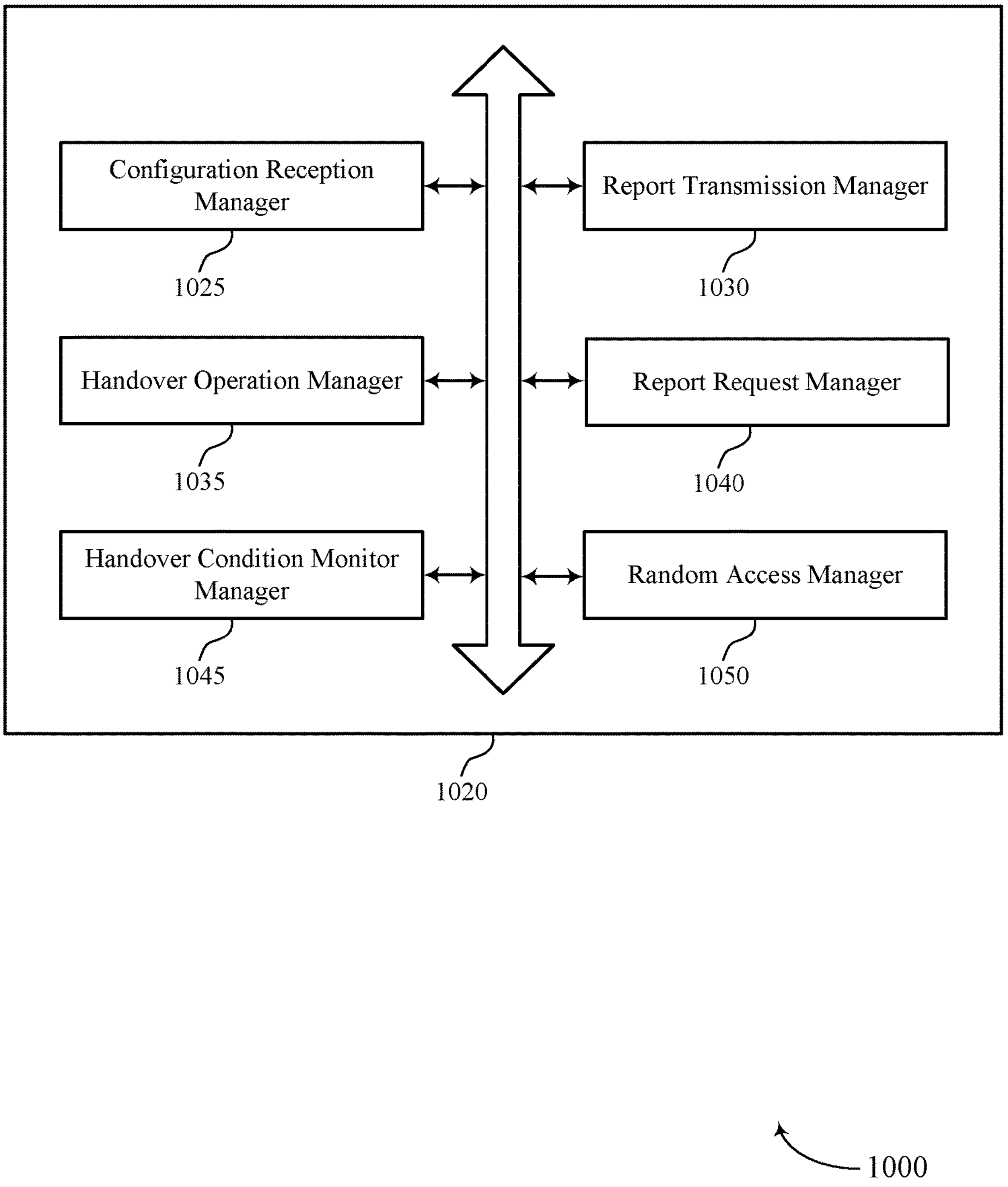
FIG. 10 shows a block diagram of a communications manager that supports digital twin assisted handover through reference signal received power prediction in accordance with one or more aspects of the present disclosure.

FIG. 10 shows a block diagram 1000 of a communications manager 1020 that supports DT assisted handover through RSRP prediction in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of DT assisted handover through RSRP prediction as described herein. For example, the communications manager 1020 may include a configuration reception manager 1025, a report transmission manager 1030, a handover operation manager 1035, a report request manager 1040, a handover condition monitor manager 1045, a random access manager 1050, or any combination thereof. Each of these components, or components or subcomponents thereof (e.g., one or more processors, one or more memories), may communicate, directly or indirectly, with one another (e.g., via one or more buses).

The communications manager 1020 may support wireless communication in accordance with examples as disclosed herein. The configuration reception manager 1025 is capable of, configured to, or operable to support a means for receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The report transmission manager 1030 is capable of, configured to, or operable to support a means for transmitting, before expiration of the handover preparation condition monitoring period, the handover-associated measurement report based on the satisfaction of the first handover condition during the handover preparation condition monitoring period. The handover operation manager 1035 is capable of, configured to, or operable to support a means for participating in a handover operation for handover of the UE from the serving network entity to the target network entity based on transmission of the handover-associated measurement report.

In some examples, to support transmitting the handover-associated measurement report, the report transmission manager 1030 is capable of, configured to, or operable to support a means for transmitting the handover-associated measurement report to the serving network entity, where the DT model is at one of the serving network entity or a DT management function.

In some examples, to support transmitting the handover-associated measurement report, the report transmission manager 1030 is capable of, configured to, or operable to support a means for transmitting the handover-associated measurement report to a DT management function associated with the serving network entity and the target network entity.

In some examples, the handover operation manager 1035 is capable of, configured to, or operable to support a means for determining, using a DT management function at the UE, that the first handover condition is expected to be satisfied during one or more future instances of the handover preparation condition monitoring period.

In some examples, the handover-associated measurement report is transmitted based on an expectation that the first handover condition is to be satisfied during the handover preparation condition monitoring period.

In some examples, the configuration reception manager 1025 is capable of, configured to, or operable to support a means for receiving a reconfiguration message in response to transmission of the handover-associated measurement report. In some examples, the handover condition monitor manager 1045 is capable of, configured to, or operable to support a means for monitoring for satisfaction of a second handover condition during a handover execution condition monitoring period that is after receipt of the reconfiguration message. In some examples, the random access manager 1050 is capable of, configured to, or operable to support a means for initiating random access with the target network entity as part of the handover operation, where initiation of the random access is before expiration of the handover execution condition monitoring period and is based on satisfaction of the second handover condition during the handover execution condition monitoring period.

In some examples, the handover condition monitor manager 1045 is capable of, configured to, or operable to support a means for determining, based on satisfaction of the second handover condition during the handover execution condition monitoring period and using the DT management function at the UE, that the second handover condition is expected to be satisfied during one or more future instances of the handover execution condition monitoring period.

In some examples, the random access with the target network entity is initiated based on an expectation that the second handover condition is to be satisfied during the handover execution condition monitoring period.

In some examples, the DT model is representative of a physical environment associated with the UE, the serving network entity, and the target network entity.

In some examples, the DT model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

In some examples, the physical environment is represented in the DT model by predicted RSRP values at the UE with respect to other components of the physical environment, or by predicted values that define a channel, at the UE, with respect to the other components of the physical environment. In some examples, the other components of the physical environment include the serving network entity and the target network entity.

In some examples, the physical environment is represented in the DT model by predicted locations of the UE based on RSRP values or channel impulse response (CIR) values at the UE with respect to other components of the physical environment. In some examples, the other components of the physical environment include the serving network entity and the target network entity.

In some examples, the physical environment is represented in the DT model by predicted trajectories of the UE based on a history of RSRP values and associated timestamps at the UE with respect to other components of the physical environment. In some examples, the other components of the physical environment include the serving network entity and the target network entity.

In some examples, the physical environment is represented in the DT model by predicted future RSRP values at the UE based on predicted trajectories of the UE and predicted coverage distribution at the UE.

In some examples, the DT model is associated with specific DT model capabilities. In some examples, the DT model capabilities include one or more supported RSRP measurement filtering types, an RSRP measurements history size, a maximum time interval during which future RSRP values are predicted, or combinations thereof.

In some examples, to support receiving the configuration information, the report request manager 1040 is capable of, configured to, or operable to support a means for receiving a request to report a history of latest received RSRP values in support of the DT model, where the request specifies that the history is for a single cell, for all neighbor cells, or for a limited quantity of cells having strongest RSRP values.

In some examples, the configuration information that is indicative that the UE is to transmit the handover-associated measurement report before expiration of the handover preparation condition monitoring period is indicated as a preparation monitoring time fraction. In some examples, the preparation monitoring time fraction is expressed as a fraction of the handover preparation condition monitoring period or as a quantity of times the first handover condition is to be satisfied during the handover preparation condition monitoring period.

In some examples, the configuration information is further indicative that the UE is to transmit the handover-associated measurement report before expiration of a handover execution condition monitoring period by an execution monitoring time fraction. In some examples, the execution monitoring time fraction is expressed as a fraction of the handover execution condition monitoring period or as a quantity of times a second handover condition is to be satisfied during the handover execution condition monitoring period.

Figure 11:
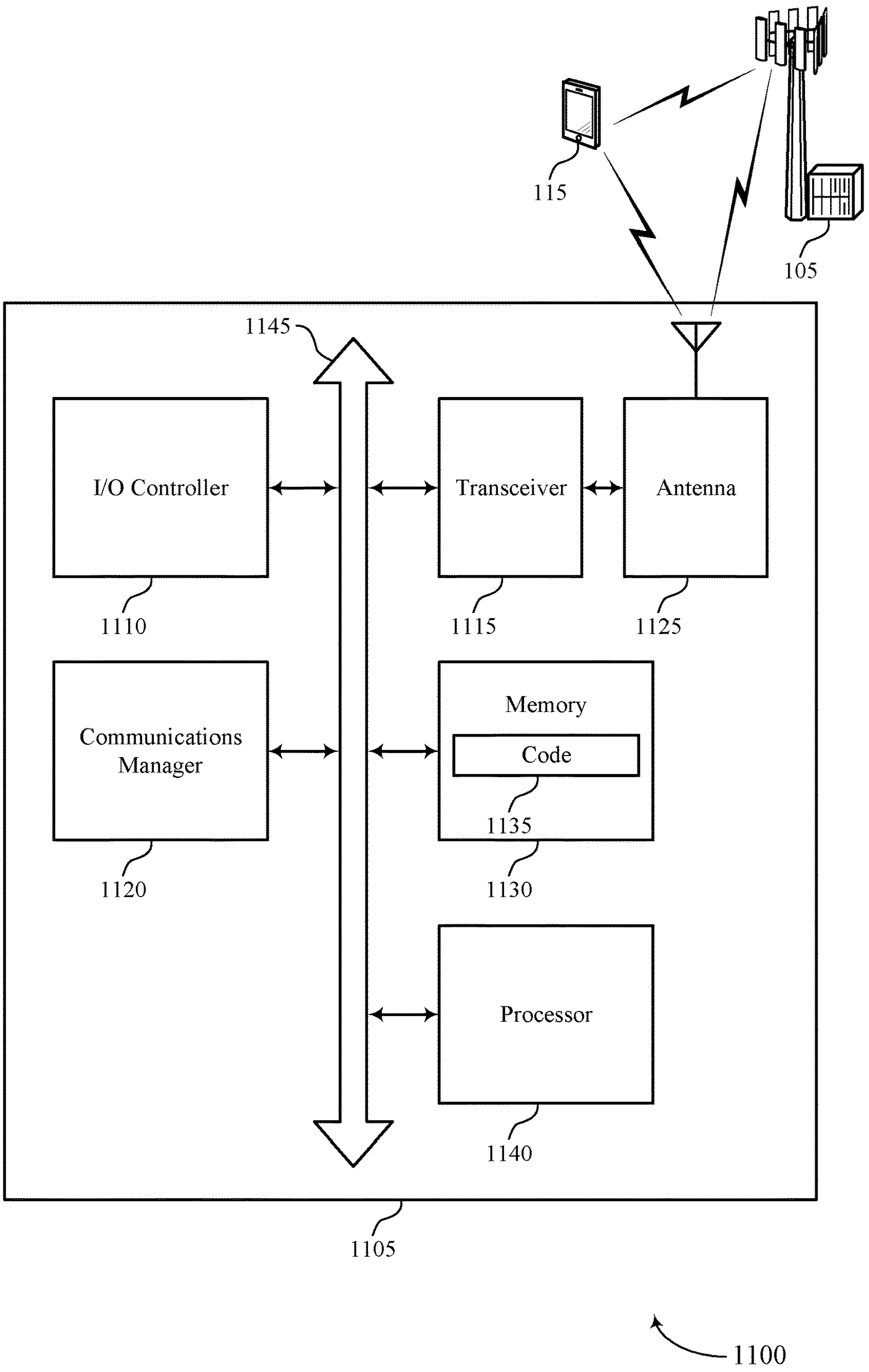
FIG. 11 shows a diagram of a system including a device that supports digital twin assisted handover through reference signal received power prediction in accordance with one or more aspects of the present disclosure.

FIG. 11 shows a diagram of a system 1100 including a device 1105 that supports DT assisted handover through RSRP prediction in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting DT assisted handover through RSRP prediction). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communication in accordance with examples as disclosed herein. For example, the communications manager 1120 is capable of, configured to, or operable to support a means for receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The communications manager 1120 is capable of, configured to, or operable to support a means for transmitting, before expiration of the handover preparation condition monitoring period, the handover-associated measurement report based on the satisfaction of the first handover condition during the handover preparation condition monitoring period. The communications manager 1120 is capable of, configured to, or operable to support a means for participating in a handover operation for handover of the UE from the serving network entity to the target network entity based on transmission of the handover-associated measurement report.

By including or configuring the communications manager 1120 in accordance with examples as described herein, the device 1105 may support techniques for reducing handover latency and RLFs.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of DT assisted handover through RSRP prediction as described herein, or the at least one processor 1140 and the at least one memory 1130 may be otherwise configured to, individually or collectively, perform or support such operations.

Figure 12:
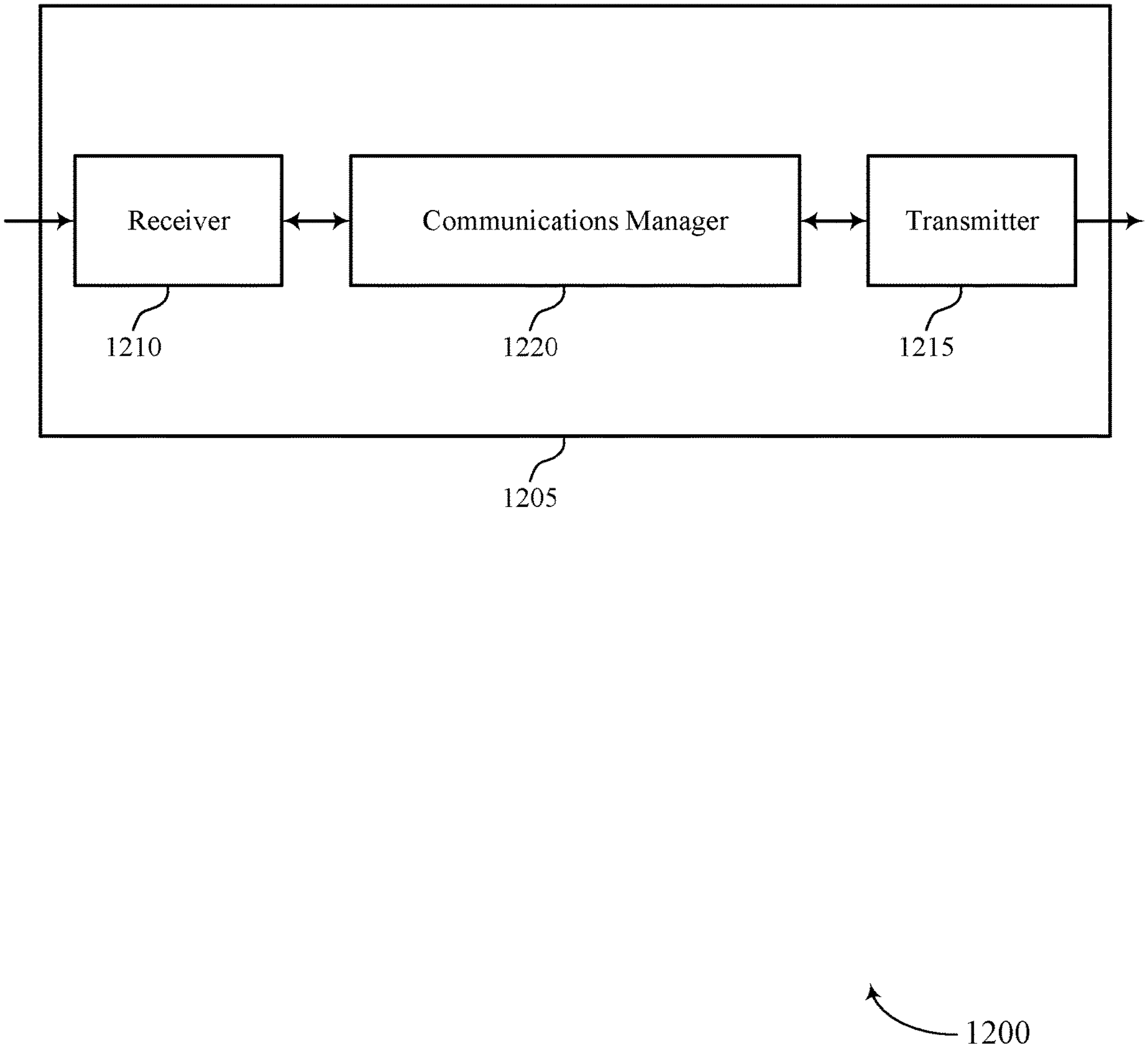
FIGS. 12 and 13 show block diagrams of devices that support digital twin assisted handover through reference signal received power prediction in accordance with one or more aspects of the present disclosure.

FIG. 12 shows a block diagram 1200 of a device 1205 that supports DT assisted handover through RSRP prediction in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of DT assisted handover through RSRP prediction as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. For example, the communications manager 1220 is capable of, configured to, or operable to support a means for transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model. The communications manager 1220 is capable of, configured to, or operable to support a means for participating in a handover operation for handover of the UE from the serving network entity to the target network entity based on the handover-associated measurement report.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for reducing handover latency and RLFs.

Figure 13:
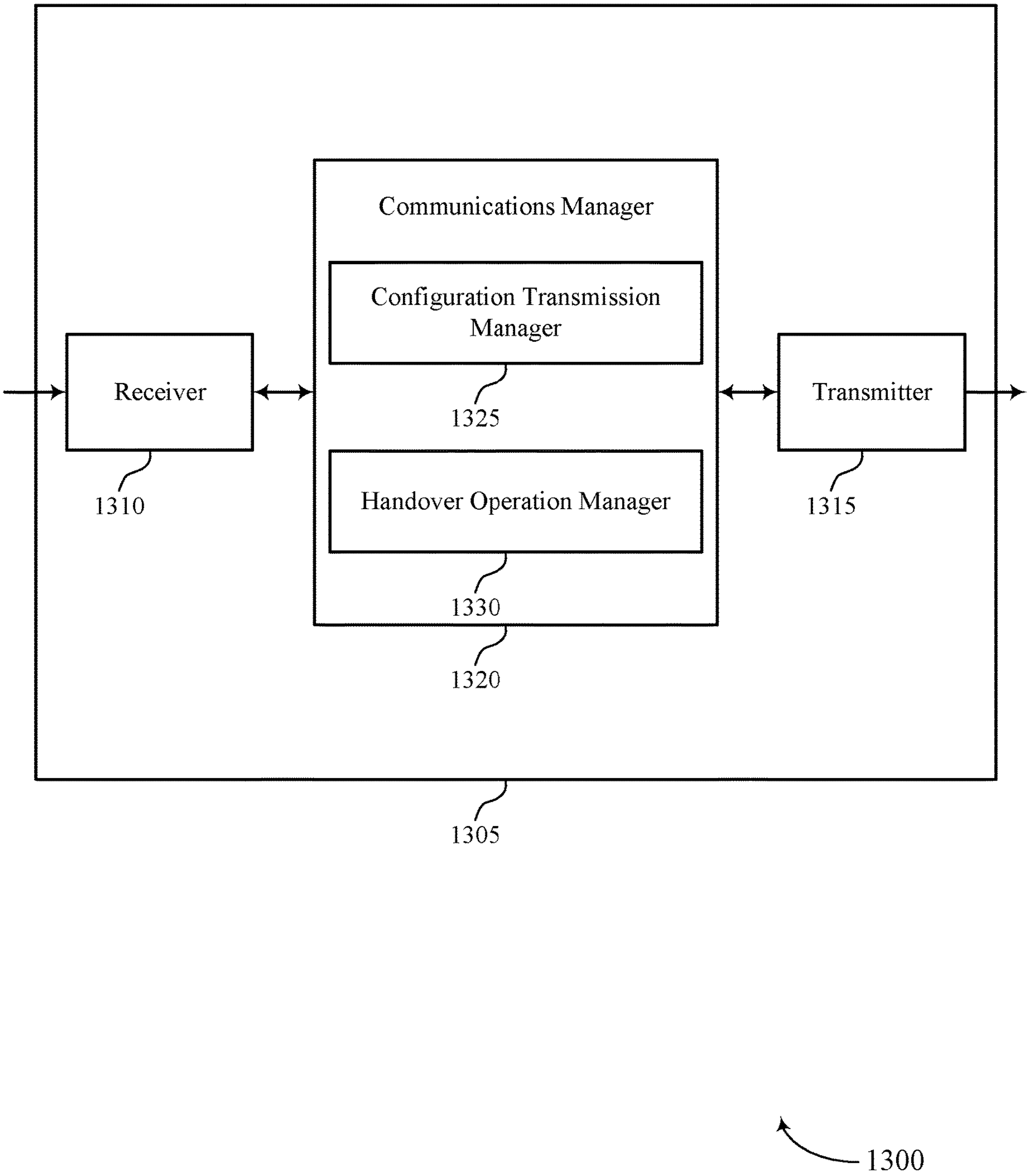

FIG. 13 shows a block diagram 1300 of a device 1305 that supports DT assisted handover through RSRP prediction in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of DT assisted handover through RSRP prediction as described herein. For example, the communications manager 1320 may include a configuration transmission manager 1325 a handover operation manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples as disclosed herein. The configuration transmission manager 1325 is capable of, configured to, or operable to support a means for transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model. The handover operation manager 1330 is capable of, configured to, or operable to support a means for participating in a handover operation for handover of the UE from the serving network entity to the target network entity based on the handover-associated measurement report.

Figure 14:
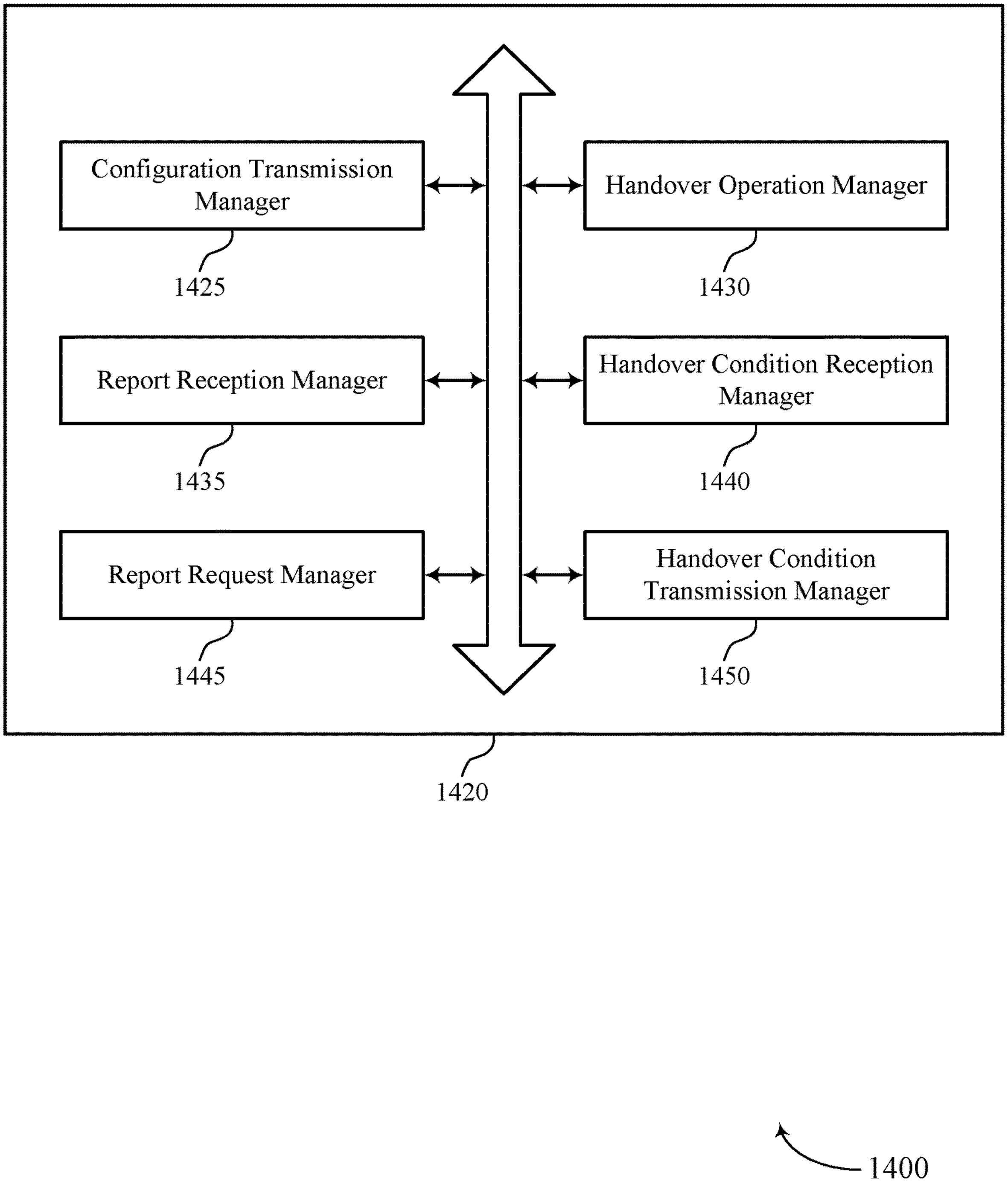
FIG. 14 shows a block diagram of a communications manager that supports digital twin assisted handover through reference signal received power prediction in accordance with one or more aspects of the present disclosure.

FIG. 14 shows a block diagram 1400 of a communications manager 1420 that supports DT assisted handover through RSRP prediction in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of DT assisted handover through RSRP prediction as described herein. For example, the communications manager 1420 may include a configuration transmission manager 1425, a handover operation manager 1430, a report reception manager 1435, a handover condition reception manager 1440, a report request manager 1445, a handover condition transmission manager 1450, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication in accordance with examples as disclosed herein. The configuration transmission manager 1425 is capable of, configured to, or operable to support a means for transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model. The handover operation manager 1430 is capable of, configured to, or operable to support a means for participating in a handover operation for handover of the UE from the serving network entity to the target network entity based on the handover-associated measurement report.

In some examples, the report reception manager 1435 is capable of, configured to, or operable to support a means for receiving the handover-associated measurement report from the UE, where the DT model is at one of the serving network entity or a DT management function.

In some examples, the report reception manager 1435 is capable of, configured to, or operable to support a means for forwarding the handover-associated measurement report to the DT management function when the DT model is at the DT management function.

In some examples, the handover operation manager 1430 is capable of, configured to, or operable to support a means for determining, when the DT model is at the serving network entity, that the first handover condition is expected to be satisfied during one or more future instances of the handover preparation condition monitoring period.

In some examples, the handover operation manager 1430 is capable of, configured to, or operable to support a means for transmitting a handover request to the target network entity based on an expectation that the first handover condition is to be satisfied during the handover preparation condition monitoring period.

In some examples, the DT model is representative of a physical environment associated with the UE, the serving network entity, and the target network entity.

In some examples, the DT model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

In some examples, the physical environment is represented in the DT model by predicted RSRP values at the UE with respect to other components of the physical environment, or by predicted values that define a channel, at the UE, with respect to the other components of the physical environment. In some examples, the other components of the physical environment include the serving network entity and the target network entity.

In some examples, the physical environment is represented in the DT model by predicted locations of the UE based on RSRP values or channel impulse response (CIR) values at the UE with respect to other components of the physical environment. In some examples, the other components of the physical environment include the serving network entity and the target network entity.

In some examples, the physical environment is represented in the DT model by predicted trajectories of the UE based on a history of RSRP values and associated timestamps at the UE with respect to other components of the physical environment. In some examples, the other components of the physical environment include the serving network entity and the target network entity.

In some examples, the physical environment is represented in the DT model by predicted future RSRP values at the UE based on predicted trajectories of the UE and predicted coverage distribution at the UE.

In some examples, the DT model is associated with specific DT model capabilities. In some examples, the DT model capabilities include one or more supported RSRP measurement filtering types, an RSRP measurements history size, a maximum time interval during which future RSRP values are predicted, or combinations thereof.

In some examples, the handover condition transmission manager 1450 is capable of, configured to, or operable to support a means for transmitting, to a DT management function, an indication of the handover preparation condition monitoring period, the RSRP measurements size supported by the DT model, the one or more supported RSRP measurement filtering types of the DT model, or combinations thereof.

In some examples, the handover condition reception manager 1440 is capable of, configured to, or operable to support a means for receiving an indication that, when the DT model is at a DT management function, that the first handover condition is expected to be satisfied during one or more future instances of the handover preparation condition monitoring period.

In some examples, to support transmitting the configuration information, the report request manager 1445 is capable of, configured to, or operable to support a means for transmitting a request to report a history of latest received RSRP values in support of the DT model, where the request specifies that the history is for a single cell, for all neighbor cells to the UE, or for a limited quantity of cells having strongest RSRP values.

In some examples, the configuration information that is indicative that the UE is to transmit the handover-associated measurement report before expiration of the handover preparation condition monitoring period is indicated as a preparation monitoring time fraction. In some examples, the preparation monitoring time fraction is expressed as a fraction of the handover preparation condition monitoring period or as a quantity of times the first handover condition is to be satisfied during the handover preparation condition monitoring period.

In some examples, the handover condition transmission manager 1450 is capable of, configured to, or operable to support a means for transmitting, to a DT management function, an indication of a preparation prediction time fraction that is associated with a preparation monitoring time fraction, where the preparation prediction time fraction is expressed as a fraction of the handover preparation condition monitoring period.

In some examples, the configuration information is further indicative that the UE is to transmit the handover-associated measurement report before expiration of a handover execution condition monitoring period by an execution monitoring time fraction. In some examples, the execution monitoring time fraction is expressed as a fraction of the handover execution condition monitoring period or as a quantity of times a second handover condition is to be satisfied during the handover execution condition monitoring period.

Figure 15:
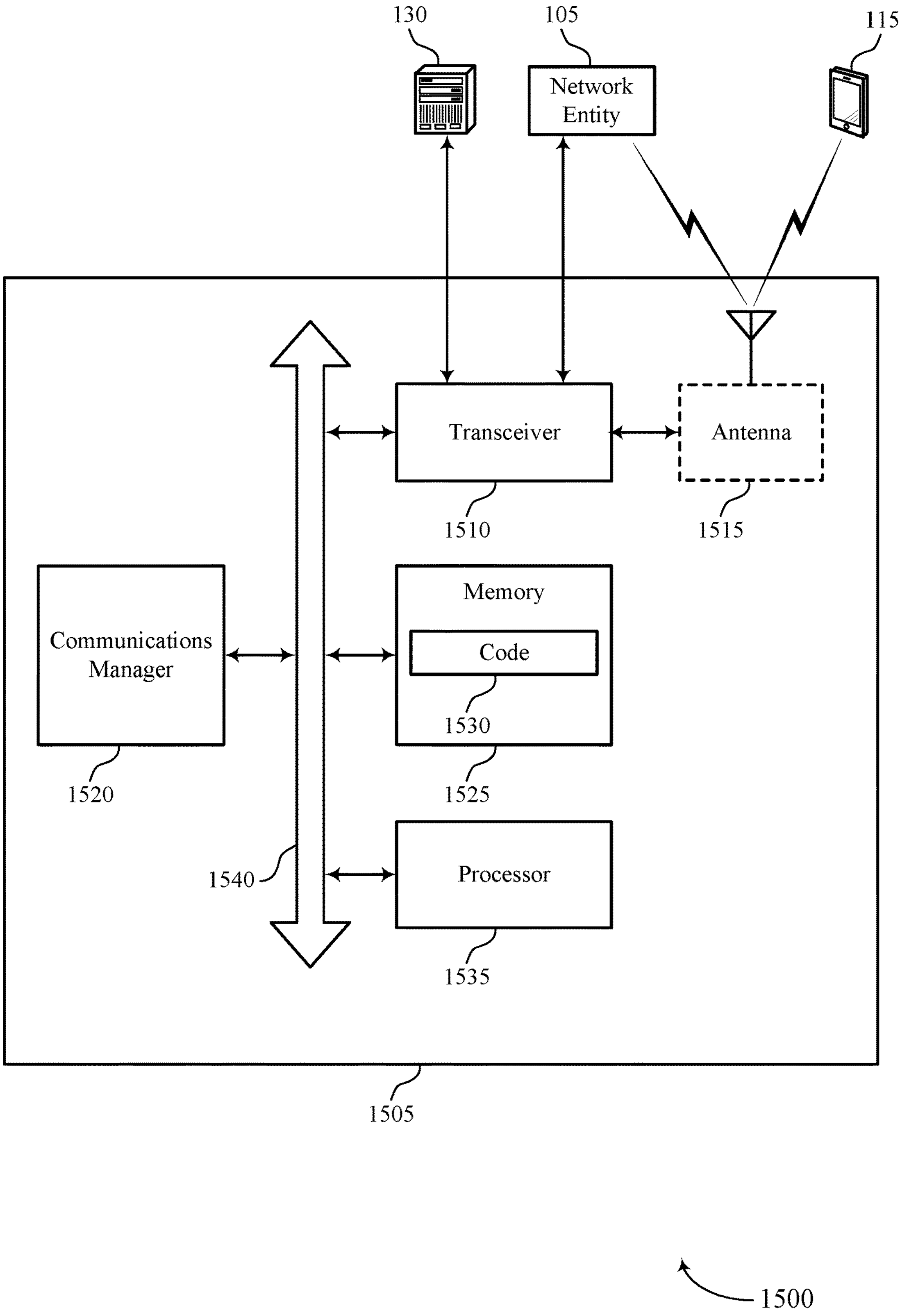
FIG. 15 shows a diagram of a system including a device that supports digital twin assisted handover through reference signal received power prediction in accordance with one or more aspects of the present disclosure.

FIG. 15 shows a diagram of a system 1500 including a device 1505 that supports DT assisted handover through RSRP prediction in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting DT assisted handover through RSRP prediction). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. As such, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication in accordance with examples as disclosed herein. For example, the communications manager 1520 is capable of, configured to, or operable to support a means for transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model. The communications manager 1520 is capable of, configured to, or operable to support a means for participating in a handover operation for handover of the UE from the serving network entity to the target network entity based on the handover-associated measurement report.

By including or configuring the communications manager 1520 in accordance with examples as described herein, the device 1505 may support techniques for reducing handover latency and RLFs.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of DT assisted handover through RSRP prediction as described herein, or the at least one processor 1535 and the at least one memory 1525 may be otherwise configured to, individually or collectively, perform or support such operations.

Figure 16:
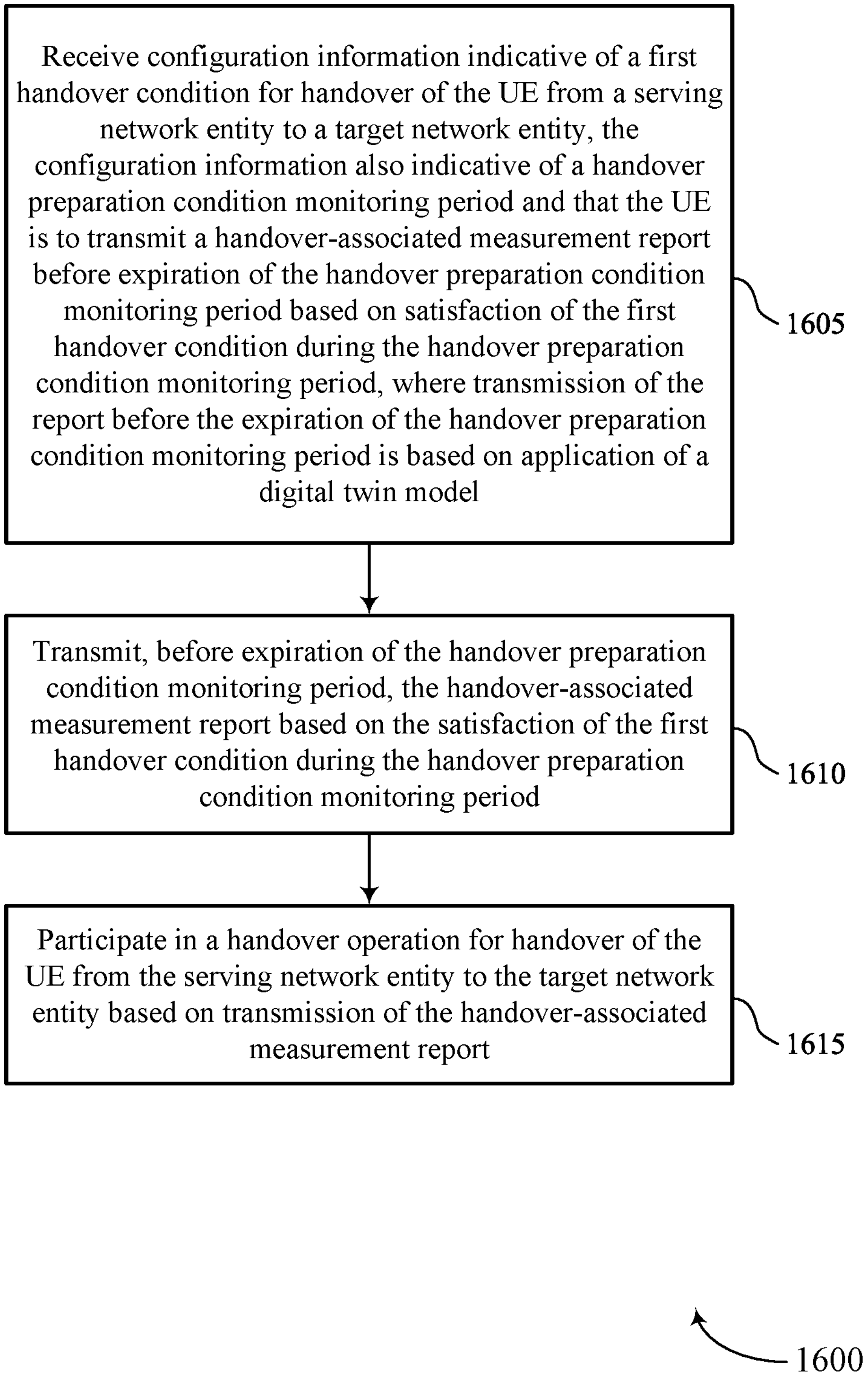
FIGS. 16 through 18 show flowcharts illustrating methods that support digital twin assisted handover through reference signal received power prediction in accordance with one or more aspects of the present disclosure.

FIG. 16 shows a flowchart illustrating a method 1600 that supports DT assisted handover through RSRP prediction in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The operations of block 1605 may be performed in accordance with examples as disclosed herein. In some examples, aspects of the operations of 1605 may be performed by a configuration reception manager 1025 as described with reference to FIG. 10.

At 1610, the method may include transmitting, before expiration of the handover preparation condition monitoring period, the handover-associated measurement report based on the satisfaction of the first handover condition during the handover preparation condition monitoring period. The operations of block 1610 may be performed in accordance with examples as disclosed herein. In some examples, aspects of the operations of 1610 may be performed by a report transmission manager 1030 as described with reference to FIG. 10.

At 1615, the method may include participating in a handover operation for handover of the UE from the serving network entity to the target network entity based on transmission of the handover-associated measurement report. The operations of block 1615 may be performed in accordance with examples as disclosed herein. In some examples, aspects of the operations of 1615 may be performed by a handover operation manager 1035 as described with reference to FIG. 10.

Figure 17:
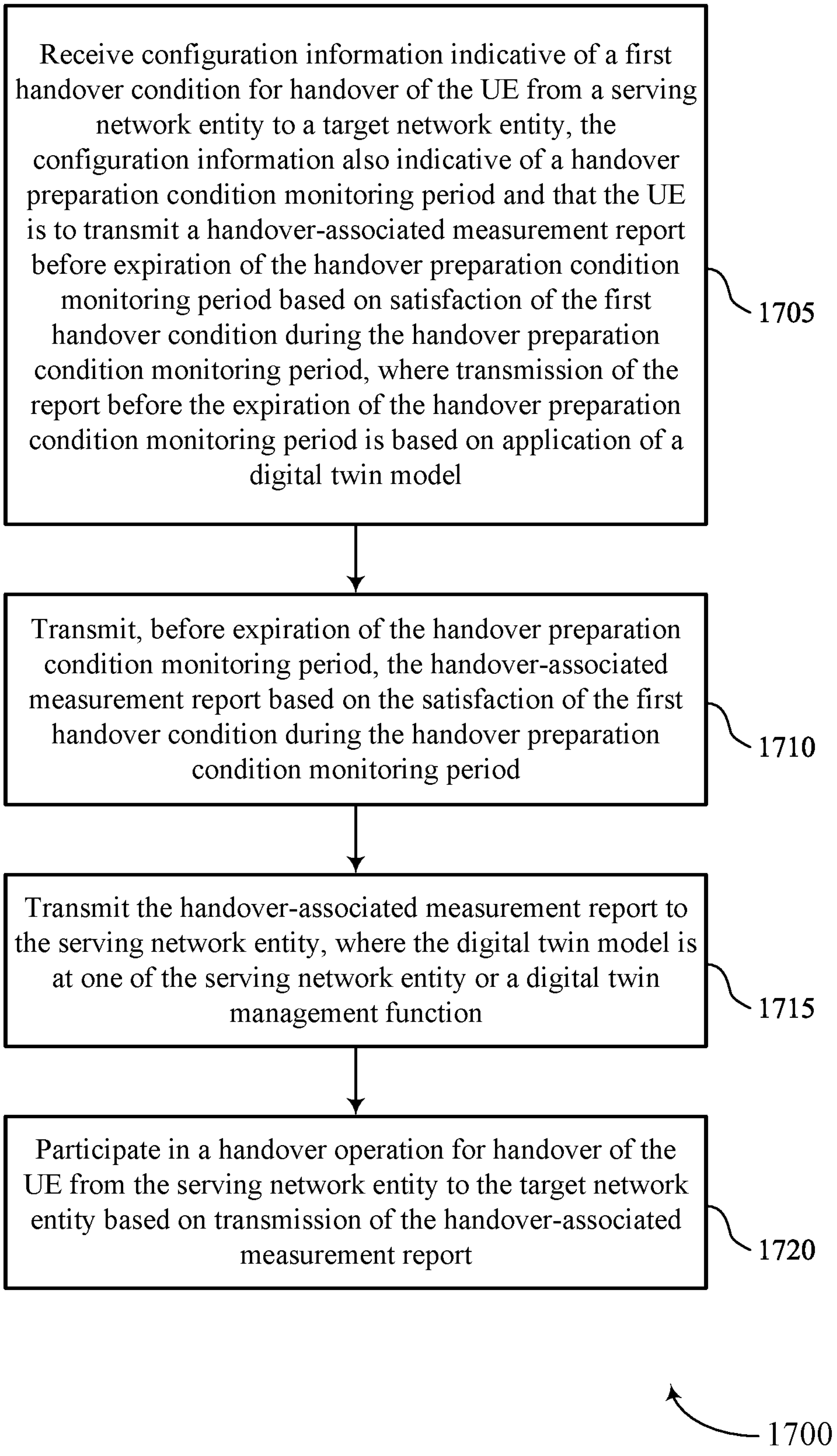

FIG. 17 shows a flowchart illustrating a method 1700 that supports DT assisted handover through RSRP prediction in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where transmission of the report before the expiration of the handover preparation condition monitoring period is based on application of a DT model. The operations of block 1705 may be performed in accordance with examples as disclosed herein. In some examples, aspects of the operations of 1705 may be performed by a configuration reception manager 1025 as described with reference to FIG. 10.

At 1710, the method may include transmitting, before expiration of the handover preparation condition monitoring period, the handover-associated measurement report based on the satisfaction of the first handover condition during the handover preparation condition monitoring period. The operations of block 1710 may be performed in accordance with examples as disclosed herein. In some examples, aspects of the operations of 1710 may be performed by a report transmission manager 1030 as described with reference to FIG. 10.

At 1715, the method may include transmitting the handover-associated measurement report to the serving network entity, where the DT model is at one of the serving network entity or a DT management function. The operations of block 1715 may be performed in accordance with examples as disclosed herein. In some examples, aspects of the operations of 1715 may be performed by a report transmission manager 1030 as described with reference to FIG. 10.

At 1720, the method may include participating in a handover operation for handover of the UE from the serving network entity to the target network entity based on transmission of the handover-associated measurement report. The operations of block 1720 may be performed in accordance with examples as disclosed herein. In some examples, aspects of the operations of 1720 may be performed by a handover operation manager 1035 as described with reference to FIG. 10.

Figure 18:
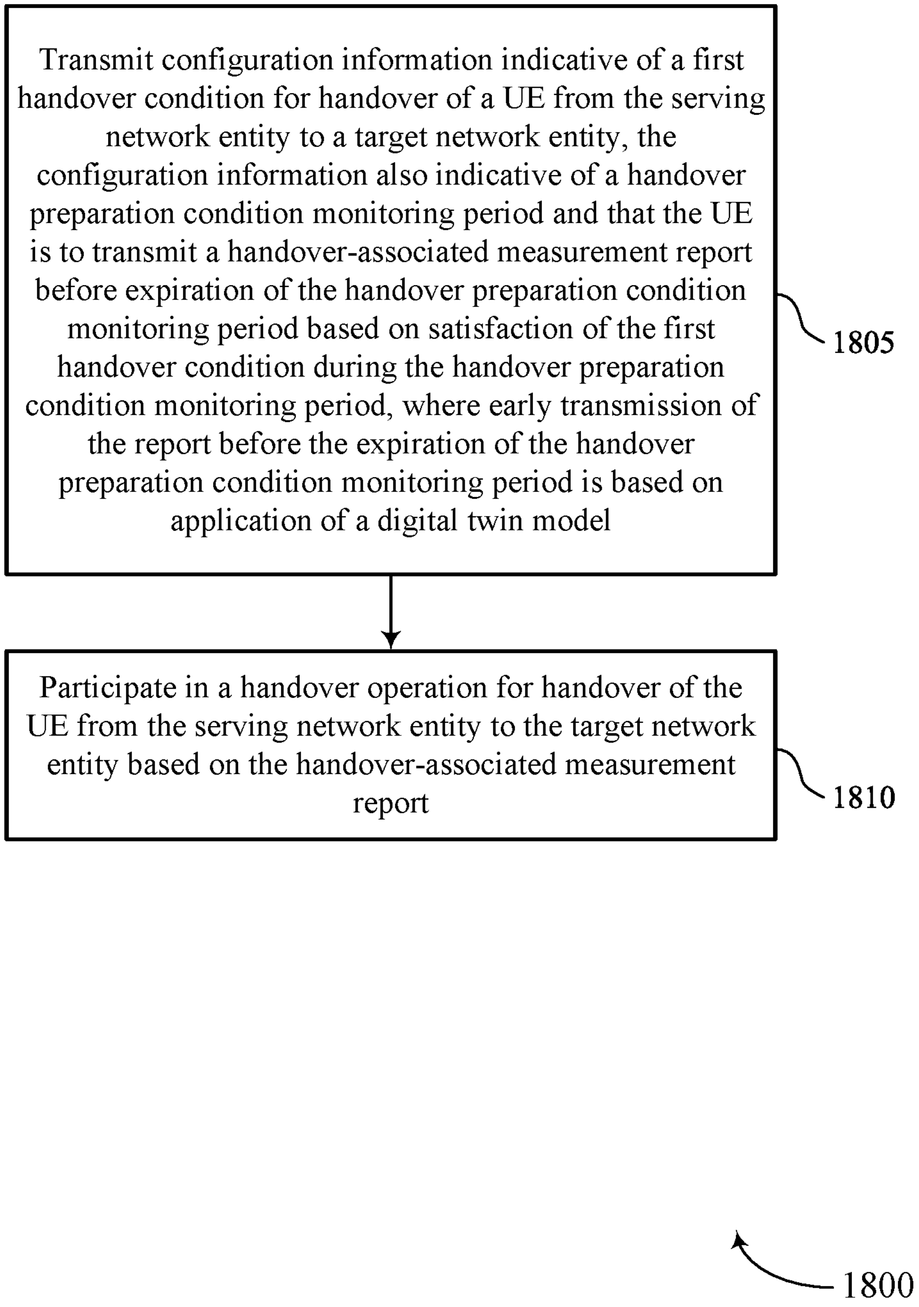

FIG. 18 shows a flowchart illustrating a method 1800 that supports DT assisted handover through RSRP prediction in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based on satisfaction of the first handover condition during the handover preparation condition monitoring period, where early transmission of the report before the expiration of the handover preparation condition monitoring period is based on application of a DT model. The operations of block 1805 may be performed in accordance with examples as disclosed herein. In some examples, aspects of the operations of 1805 may be performed by a configuration transmission manager 1425 as described with reference to FIG. 14.

At 1810, the method may include participating in a handover operation for handover of the UE from the serving network entity to the target network entity based on the handover-associated measurement report. The operations of block 1810 may be performed in accordance with examples as disclosed herein. In some examples, aspects of the operations of 1810 may be performed by a handover operation manager 1430 as described with reference to FIG. 14.

The following provides an overview of aspects of the present disclosure:

Aspect 1: A method for wireless communication at a UE, comprising: receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during the handover preparation condition monitoring period, wherein transmission of the report before the expiration of the handover preparation condition monitoring period is based on application of a DT model; transmitting, before expiration of the handover preparation condition monitoring period, the handover-associated measurement report based on the satisfaction of the first handover condition during the handover preparation condition monitoring period; and participating in a handover operation for handover of the UE from the serving network entity to the target network entity based on transmission of the handover-associated measurement report.

Aspect 2: The method of aspect 1, wherein transmitting the handover-associated measurement report comprises: transmitting the handover-associated measurement report to the serving network entity, wherein the DT model is at one of the serving network entity or a DTMF.

Aspect 3: The method of any of aspects 1 through 2, wherein transmitting the handover-associated measurement report comprises: transmitting the handover-associated measurement report to a DTMF associated with the serving network entity and the target network entity.

Aspect 4: The method of any of aspects 1 through 3, further comprising: determining, using a DTMF at the UE, that the first handover condition is expected to be satisfied during one or more future instances of the handover preparation condition monitoring period.

Aspect 5: The method of aspect 4, wherein the handover-associated measurement report is transmitted based at least in part on an expectation that the first handover condition is to be satisfied during the handover preparation condition monitoring period.

Aspect 6: The method of aspect 5, further comprising: receiving a reconfiguration message in response to transmission of the handover-associated measurement report; monitoring for satisfaction of a second handover condition during a handover execution condition monitoring period that is after receipt of the reconfiguration message; and initiating random access with the target network entity as part of the handover operation, wherein initiation of the random access is before expiration of the handover execution condition monitoring period and is based on satisfaction of the second handover condition during the handover execution condition monitoring period.

Aspect 7: The method of aspect 6, further comprising: determining, based on satisfaction of the second handover condition during the handover execution condition monitoring period and using the DTMF at the UE, that the second handover condition is expected to be satisfied during one or more future instances of the handover execution condition monitoring period.

Aspect 8: The method of aspect 7, wherein the random access with the target network entity is initiated based at least in part on an expectation that the second handover condition is to be satisfied during the handover execution condition monitoring period.

Aspect 9: The method of any of aspects 1 through 8, wherein the DT model is representative of a physical environment associated with the UE, the serving network entity, and the target network entity.

Aspect 10: The method of aspect 9, wherein the DT model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

Aspect 11: The method of any of aspects 9 through 10, wherein the physical environment is represented in the DT model by predicted RSRP values at the UE with respect to other components of the physical environment, or by predicted values that define a channel, at the UE, with respect to the other components of the physical environment, the other components of the physical environment include the serving network entity and the target network entity.

Aspect 12: The method of any of aspects 9 through 11, wherein the physical environment is represented in the DT model by predicted locations of the UE based on RSRP values or CIR values at the UE with respect to other components of the physical environment, the other components of the physical environment include the serving network entity and the target network entity.

Aspect 13: The method of any of aspects 9 through 12, wherein the physical environment is represented in the DT model by predicted trajectories of the UE based on a history of RSRP values and associated timestamps at the UE with respect to other components of the physical environment, the other components of the physical environment include the serving network entity and the target network entity.

Aspect 14: The method of any of aspects 9 through 13, wherein the physical environment is represented in the DT model by predicted future RSRP values at the UE based on predicted trajectories of the UE and predicted coverage distribution at the UE.

Aspect 15: The method of any of aspects 1 through 14, wherein the DT model is associated with specific DT model capabilities, the DT model capabilities include one or more supported RSRP measurement filtering types, an RSRP measurements history size, a maximum time interval during which future RSRP values are predicted, or combinations thereof.

Aspect 16: The method of any of aspects 1 through 15, wherein receiving the configuration information comprises: receiving a request to report a history of latest received RSRP values in support of the DT model, wherein the request specifies that the history is for a single cell, for all neighbor cells, or for a limited quantity of cells having strongest RSRP values.

Aspect 17: The method of any of aspects 1 through 16, wherein the configuration information that is indicative that the UE is to transmit the handover-associated measurement report before expiration of the handover preparation condition monitoring period is indicated as a preparation monitoring time fraction, the preparation monitoring time fraction is expressed as a fraction of the handover preparation condition monitoring period or as a quantity of times the first handover condition is to be satisfied during the handover preparation condition monitoring period.

Aspect 18: The method of any of aspects 1 through 17, wherein the configuration information is further indicative that the UE is to transmit the handover-associated measurement report before expiration of a handover execution condition monitoring period by an execution monitoring time fraction, the execution monitoring time fraction is expressed as a fraction of the handover execution condition monitoring period or as a quantity of times a second handover condition is to be satisfied during the handover execution condition monitoring period.

Aspect 19: A method for wireless communication at a serving network entity, comprising: transmitting configuration information indicative of a first handover condition for handover of a UE from the serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during the handover preparation condition monitoring period, wherein early transmission of the report before the expiration of the handover preparation condition monitoring period is based on application of a DT model; and participating in a handover operation for handover of the UE from the serving network entity to the target network entity based on the handover-associated measurement report.

Aspect 20: The method of aspect 19, further comprising: receiving the handover-associated measurement report from the UE, wherein the DT model is at one of the serving network entity or a DTMF.

Aspect 21: The method of aspect 20, further comprising: forwarding the handover-associated measurement report to the DTMF when the DT model is at the DTMF.

Aspect 22: The method of any of aspects 20 through 21, further comprising: determining, when the DT model is at the serving network entity, that the first handover condition is expected to be satisfied during one or more future instances of the handover preparation condition monitoring period.

Aspect 23: The method of aspect 22, further comprising: transmitting a handover request to the target network entity based at least in part on an expectation that the first handover condition is to be satisfied during the handover preparation condition monitoring period.

Aspect 24: The method of any of aspects 19 through 23, wherein the DT model is representative of a physical environment associated with the UE, the serving network entity, and the target network entity.

Aspect 25: The method of aspect 24, wherein the DT model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

Aspect 26: The method of any of aspects 24 through 25, wherein the physical environment is represented in the DT model by predicted RSRP values at the UE with respect to other components of the physical environment, or by predicted values that define a channel, at the UE, with respect to the other components of the physical environment, the other components of the physical environment include the serving network entity and the target network entity.

Aspect 27: The method of any of aspects 24 through 26, wherein the physical environment is represented in the DT model by predicted locations of the UE based on RSRP values or CIR values at the UE with respect to other components of the physical environment, the other components of the physical environment include the serving network entity and the target network entity.

Aspect 28: The method of any of aspects 24 through 27, wherein the physical environment is represented in the DT model by predicted trajectories of the UE based on a history of RSRP values and associated timestamps at the UE with respect to other components of the physical environment, the other components of the physical environment include the serving network entity and the target network entity.

Aspect 29: The method of any of aspects 24 through 28, wherein the physical environment is represented in the DT model by predicted future RSRP values at the UE based on predicted trajectories of the UE and predicted coverage distribution at the UE.

Aspect 30: The method of any of aspects 19 through 29, wherein the DT model is associated with specific DT model capabilities, the DT model capabilities include one or more supported RSRP measurement filtering types, an RSRP measurements history size, a maximum time interval during which future RSRP values are predicted, or combinations thereof.

Aspect 31: The method of aspect 30, further comprising: transmitting, to a DTMF, an indication of the handover preparation condition monitoring period, the RSRP measurements size supported by the DT model, the one or more supported RSRP measurement filtering types of the DT model, or combinations thereof.

Aspect 32: The method of any of aspects 19 through 31, further comprising: receiving an indication that, when the DT model is at a DTMF, that the first handover condition is expected to be satisfied during one or more future instances of the handover preparation condition monitoring period.

Aspect 33: The method of any of aspects 19 through 32, wherein transmitting the configuration information comprises: transmitting a request to report a history of latest received RSRP values in support of the DT model, wherein the request specifies that the history is for a single cell, for all neighbor cells to the UE, or for a limited quantity of cells having strongest RSRP values.

Aspect 34: The method of any of aspects 19 through 33, wherein the configuration information that is indicative that the UE is to transmit the handover-associated measurement report before expiration of the handover preparation condition monitoring period is indicated as a preparation monitoring time fraction, the preparation monitoring time fraction is expressed as a fraction of the handover preparation condition monitoring period or as a quantity of times the first handover condition is to be satisfied during the handover preparation condition monitoring period.

Aspect 35: The method of any of aspects 19 through 34, further comprising: transmitting, to a DTMF, an indication of a preparation prediction time fraction that is associated with a preparation monitoring time fraction, wherein the preparation prediction time fraction is expressed as a fraction of the handover prediction condition monitoring period.

Aspect 36: The method of any of aspects 19 through 35, wherein the configuration information is further indicative that the UE is to transmit the handover-associated measurement report before expiration of a handover execution condition monitoring period by an execution monitoring time fraction, the execution monitoring time fraction is expressed as a fraction of the handover execution condition monitoring period or as a quantity of times a second handover condition is to be satisfied during the handover execution condition monitoring period.

Aspect 37: A UE for wireless communication, comprising one or more memories storing processor-executable code, and one or more processors coupled with the one or more memories and individually or collectively operable to execute the code to cause the UE to perform a method of any of aspects 1 through 18.

Aspect 38: A UE for wireless communication, comprising at least one means for performing a method of any of aspects 1 through 18.

Aspect 39: A non-transitory computer-readable medium storing code for wireless communication, the code comprising instructions executable by one or more processors to perform a method of any of aspects 1 through 18.

Aspect 40: A serving network entity for wireless communication, comprising one or more memories storing processor-executable code, and one or more processors coupled with the one or more memories and individually or collectively operable to execute the code to cause the serving network entity to perform a method of any of aspects 19 through 36.

Aspect 41: A serving network entity for wireless communication, comprising at least one means for performing a method of any of aspects 19 through 36.

Aspect 42: A non-transitory computer-readable medium storing code for wireless communication, the code comprising instructions executable by one or more processors to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during a first portion of the handover preparation condition monitoring period, wherein transmission of the report before the expiration of the handover preparation condition monitoring period is based on application of a digital twin model configured to predict, in response to the satisfaction of the first handover condition during the first portion, whether the first handover condition is satisfied during a remaining portion of the handover preparation condition monitoring period that is subsequent to the first portion;

transmit, before expiration of the handover preparation condition monitoring period, the handover-associated measurement report based on the satisfaction of the first handover condition during the first portion of the handover preparation condition monitoring period and based on a predicted satisfaction of the first handover condition during the remaining portion of the handover preparation condition monitoring period; and participate in a handover operation for handover of the UE from the serving network entity to the target network entity based on transmission of the handover-associated measurement report.

2. The UE of claim 1, wherein, to transmit the handover-associated measurement report, the one or more processors are individually or collectively operable to execute the code to cause the UE to:

transmit the handover-associated measurement report to the serving network entity, wherein the digital twin model is at one of the serving network entity or a digital twin management function.

3. The UE of claim 1, wherein, to transmit the handover-associated measurement report, the one or more processors are individually or collectively operable to execute the code to cause the UE to:

transmit the handover-associated measurement report to a digital twin management function associated with the serving network entity and the target network entity.

4. The UE of claim 1, wherein the one or more processors are individually or collectively further operable to execute the code to cause the UE to:

determine, using a digital twin management function at the UE, that the first handover condition is expected to be satisfied during the remaining portion of the handover preparation condition monitoring period.

5. The UE of claim 4, wherein the handover-associated measurement report is transmitted based at least in part on an expectation that the first handover condition is to be satisfied during the handover preparation condition monitoring period.

6. The UE of claim 5, wherein the one or more processors are individually or collectively further operable to execute the code to cause the UE to:

receive a reconfiguration message in response to transmission of the handover-associated measurement report;

monitor for satisfaction of a second handover condition during a handover execution condition monitoring period that is after receipt of the reconfiguration message; and initiate random access with the target network entity as part of the handover operation, wherein initiation of the random access is before expiration of the handover execution condition monitoring period and is based on satisfaction of the second handover condition during the handover execution condition monitoring period.

7. The UE of claim 6, wherein the one or more processors are individually or collectively further operable to execute the code to cause the UE to:

determine, based on satisfaction of the second handover condition during the handover execution condition monitoring period and using the digital twin management function at the UE, that the second handover condition is expected to be satisfied during one or more future instances of the handover execution condition monitoring period.

8. The UE of claim 7, wherein the random access with the target network entity is initiated based at least in part on an expectation that the second handover condition is to be satisfied during the handover execution condition monitoring period.

9. The UE of claim 1, wherein the digital twin model is representative of a physical environment associated with the UE, the serving network entity, and the target network entity.

10. The UE of claim 9, wherein the digital twin model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

11. The UE of claim 9, wherein:

the physical environment is represented in the digital twin model by predicted reference signal received power (RSRP) values at the UE with respect to other components of the physical environment, or by predicted values that define a channel, at the UE, with respect to other components of the physical environment, the other components of the physical environment include the serving network entity and the target network entity.

12. The UE of claim 9, wherein:

the physical environment is represented in the digital twin model by predicted locations of the UE based on reference signal received power (RSRP) values or channel impulse response (CIR) values at the UE with respect to other components of the physical environment, the other components of the physical environment include the serving network entity and the target network entity.

13. The UE of claim 9, wherein:

the physical environment is represented in the digital twin model by predicted trajectories of the UE based on a history of reference signal received power (RSRP) values and associated timestamps at the UE with respect to other components of the physical environment, the other components of the physical environment include the serving network entity and the target network entity.

14. The UE of claim 9, wherein the physical environment is represented in the digital twin model by predicted future reference signal received power (RSRP) values at the UE based on predicted trajectories of the UE and predicted coverage distribution at the UE.

15. The UE of claim 1, wherein:

the digital twin model is associated with specific digital twin model capabilities, the digital twin model capabilities include one or more supported reference signal received power (RSRP) measurement filtering types, an RSRP measurements history size, a maximum time interval during which future RSRP values are predicted, or combinations thereof.

16. The UE of claim 1, wherein, to receive the configuration information, the one or more processors are individually or collectively operable to execute the code to cause the UE to:

receive a request to report a history of latest received reference signal received power (RSRP) values in support of the digital twin model, wherein the request specifies that the history is for a single cell, for all neighbor cells, or for a limited quantity of cells having strongest RSRP values.

17. The UE of claim 1, wherein:

the configuration information that is indicative that the UE is to transmit the handover-associated measurement report before expiration of the handover preparation condition monitoring period is indicated as a portion of the handover preparation condition monitoring period or as a quantity of times the first handover condition is to be satisfied during the handover preparation condition monitoring period.

18. The UE of claim 1, wherein:

the configuration information is further indicative that the UE is to transmit the handover-associated measurement report before expiration of a handover execution condition monitoring period by a portion of time of the handover execution condition monitoring period or before a quantity of times a second handover condition is to be satisfied during the handover execution condition monitoring period.

19. A serving network entity, comprising:

one or more memories storing processor-executable code; and one or more processors coupled with the one or more memories and individually or collectively operable to execute the code to cause the serving network entity to:

transmit configuration information indicative of a first handover condition for handover of a user equipment (UE) from the serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during a first portion of the handover preparation condition monitoring period, wherein the transmission of the report before the expiration of the handover preparation condition monitoring period is based on application of a digital twin model configured to predict, in response to the satisfaction of the first handover condition during the first portion, whether the first handover condition is satisfied during a remaining portion of the handover preparation condition monitoring period that is subsequent to the first portion; and participate in a handover operation for handover of the UE from the serving network entity to the target network entity based on the handover-associated measurement report.

20. The serving network entity of claim 19, wherein the one or more processors are individually or collectively further operable to execute the code to cause the serving network entity to:

receive the handover-associated measurement report from the UE, wherein the digital twin model is at one of the serving network entity or a digital twin management function.

21. The serving network entity of claim 20, wherein the one or more processors are individually or collectively further operable to execute the code to cause the serving network entity to:

forward the handover-associated measurement report to the digital twin management function when the digital twin model is at the digital twin management function.

22. The serving network entity of claim 20, wherein the one or more processors are individually or collectively further operable to execute the code to cause the serving network entity to:

determine, when the digital twin model is at the serving network entity, that the first handover condition is expected to be satisfied during the remaining portion of the handover preparation condition monitoring period.

23. The serving network entity of claim 22, wherein the one or more processors are individually or collectively further operable to execute the code to cause the serving network entity to:

transmit a handover request to the target network entity based at least in part on an expectation that the first handover condition is to be satisfied during the handover preparation condition monitoring period.

24. The serving network entity of claim 19, wherein the digital twin model is representative of a physical environment associated with the UE, the serving network entity, and the target network entity.

25. The serving network entity of claim 24, wherein the digital twin model is further representative of an antenna radiation pattern associated with the UE, noise patterns associated with the UE, transmission power patterns associated with the serving network entity, transmission power patterns associated with the target network entity, radio frequency coverage associated with the serving network entity and the target network entity, ray tracing associated with the serving network entity, the target network entity, and the UE, or any combination thereof.

26. The serving network entity of claim 24, wherein:

the physical environment is represented in the digital twin model by predicted reference signal received power (RSRP) values at the UE with respect to other components of the physical environment, or by predicted values that define a channel, at the UE, with respect to other components of the physical environment, the other components of the physical environment include the serving network entity and the target network entity.

27. The serving network entity of claim 24, wherein:

the physical environment is represented in the digital twin model by predicted locations of the UE based on reference signal received power (RSRP) values or channel impulse response (CIR) values at the UE with respect to other components of the physical environment, the other components of the physical environment include the serving network entity and the target network entity.

28. The serving network entity of claim 19, wherein:

the digital twin model is associated with specific digital twin model capabilities, the digital twin model capabilities include one or more supported reference signal received power (RSRP) measurement filtering types, an RSRP measurements history size, a maximum time interval during which future RSRP values are predicted, or combinations thereof.

29. A method for wireless communication at a user equipment (UE), comprising:

receiving configuration information indicative of a first handover condition for handover of the UE from a serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during a first portion of the handover preparation condition monitoring period, wherein transmission of the report before the expiration of the handover preparation condition monitoring period is based on application of a digital twin model configured to predict, in response to the satisfaction of the first handover condition during the first portion, whether the first handover condition is satisfied during a remaining portion of the handover preparation condition monitoring period that is subsequent to the first portion;

transmitting, before expiration of the handover preparation condition monitoring period, the handover-associated measurement report based on the satisfaction of the first handover condition during the first portion of the handover preparation condition monitoring period and based on a predicted satisfaction of the first handover condition during the remaining portion of the handover preparation condition monitoring period; and participating in a handover operation for handover of the UE from the serving network entity to the target network entity based on transmission of the handover-associated measurement report.

30. A method for wireless communication at a serving network entity, comprising:

transmitting configuration information indicative of a first handover condition for handover of a user equipment (UE) from the serving network entity to a target network entity, the configuration information also indicative of a handover preparation condition monitoring period and that the UE is to transmit a handover-associated measurement report before expiration of the handover preparation condition monitoring period based at least in part on satisfaction of the first handover condition during a first portion of the handover preparation condition monitoring period, wherein the transmission of the report before the expiration of the handover preparation condition monitoring period is based on application of a digital twin model configured to predict, in response to the satisfaction of the first handover condition during the first portion, whether the first handover condition is satisfied during a remaining portion of the handover preparation condition monitoring period that is subsequent to the first portion; and participating in a handover operation for handover of the UE from the serving network entity to the target network entity based on the handover-associated measurement report.

* * * * *